US012580785B2

(12) United States Patent
Sodoma et al.

(10) Patent No.: US 12,580,785 B2
(45) Date of Patent: Mar. 17, 2026

(54) ENHANCED TECHNIQUES FOR REDUCING AUDIO FEEDBACK DURING COMMUNICATION SESSIONS

(71) Applicant: Microsoft Technology Licensing, LLC, Redmond, WA (US)

(72) Inventors: Hong Wang Sodoma, Redmond, WA (US); Warren M. Lam, Redmond, WA (US); Vinod Prakash, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/680,010

(22) Filed: May 31, 2024

(65) Prior Publication Data

US 2025/0373459 A1 Dec. 4, 2025

(51) Int. Cl.
*H04L 12/18* (2006.01)
*H04M 3/56* (2006.01)

(52) U.S. Cl.
CPC ...... *H04L 12/1822* (2013.01); *H04L 12/1831* (2013.01); *H04M 3/568* (2013.01)

(58) Field of Classification Search
None
See application file for complete search history.

(56) References Cited

U.S. PATENT DOCUMENTS 9,819,905 B1 * 11/2017 Breitbard ............ H04L 65/1069
10,074,371 B1 * 9/2018 Wang ...................... G10L 15/08
10,237,402 B1 * 3/2019 Pan .......................... G10L 15/26
10,339,957 B1 * 7/2019 Chenier ................ H04L 67/306
10,412,206 B1 * 9/2019 Liang ................ H04M 3/42068
10,771,272 B1 * 9/2020 Ghanaie-Sichanie ........................
H04W 28/24
10,833,920 B1 * 11/2020 Ramanadham ..... H04L 41/0661
11,588,865 B2 * 2/2023 Lamanna ................ H04L 65/80
(Continued)

FOREIGN PATENT DOCUMENTS

WO WO-2021086731 A1 * 5/2021 ........... H04L 65/756
WO WO-2021118686 A1 * 6/2021 ............. G10L 15/16

OTHER PUBLICATIONS

Extended European search report received in European Application No. 25179440.0, mailed on Oct. 15, 2025, 11 pages.

*Primary Examiner* — Phyllis A Book
(74) *Attorney, Agent, or Firm* — Scott Y. Shigeta; Newport IP, LLC

(57) ABSTRACT

The disclosed techniques provide enhanced techniques for reducing audio feedback during communication sessions. A system utilizes beacon signals to determine if two or more client devices are co-located. The system uses two different beacon signals communicated from two different devices if one of the devices joins a meeting with an active microphone. However, the system only utilizes one beacon signal from the joining device if the joining device has a muted microphone and speaker. Once two or more client devices are determined to be co-located, the system invokes a co-location mode that activates the microphones of each co-located client devices to allow each device to contribute audio content to a meeting for use in transcripts, recordings, meeting summaries, and verbal commands, while also preventing the co-located devices from sharing audio signals between one another.

20 Claims, 24 Drawing Sheets

(56)                    References Cited

U.S. PATENT DOCUMENTS

| | | | |
|---|---|---|---|
| 11,722,571 B1 * | 8/2023 | Chenier | G10L 17/22 |
| | | | 709/224 |
| 11,743,065 B2 * | 8/2023 | Desai | G06V 40/107 |
| | | | 709/204 |
| 12,308,029 B2 * | 5/2025 | Truong | H04L 12/2829 |
| 2015/0117626 A1 | 4/2015 | Nord | |
| 2018/0115432 A1 | 4/2018 | Cutler | |
| 2019/0036856 A1 * | 1/2019 | Bergenlid | G06F 16/44 |
| 2019/0379752 A1 | 12/2019 | Digilov | |
| 2021/0136129 A1 * | 5/2021 | Ponnusamy | G06F 9/451 |
| 2021/0136130 A1 * | 5/2021 | Ponnusamy | H04L 12/1822 |
| 2021/0176285 A1 | 6/2021 | Vanderheeren | |
| 2021/0195325 A1 * | 6/2021 | Edry | H04M 3/002 |
| 2022/0319522 A1 | 10/2022 | Guevara | |
| 2022/0368993 A1 * | 11/2022 | Kim | H04L 65/4015 |
| 2022/0398904 A1 | 12/2022 | Lagnado | |
| 2023/0129867 A1 | 4/2023 | Casas | |

* cited by examiner

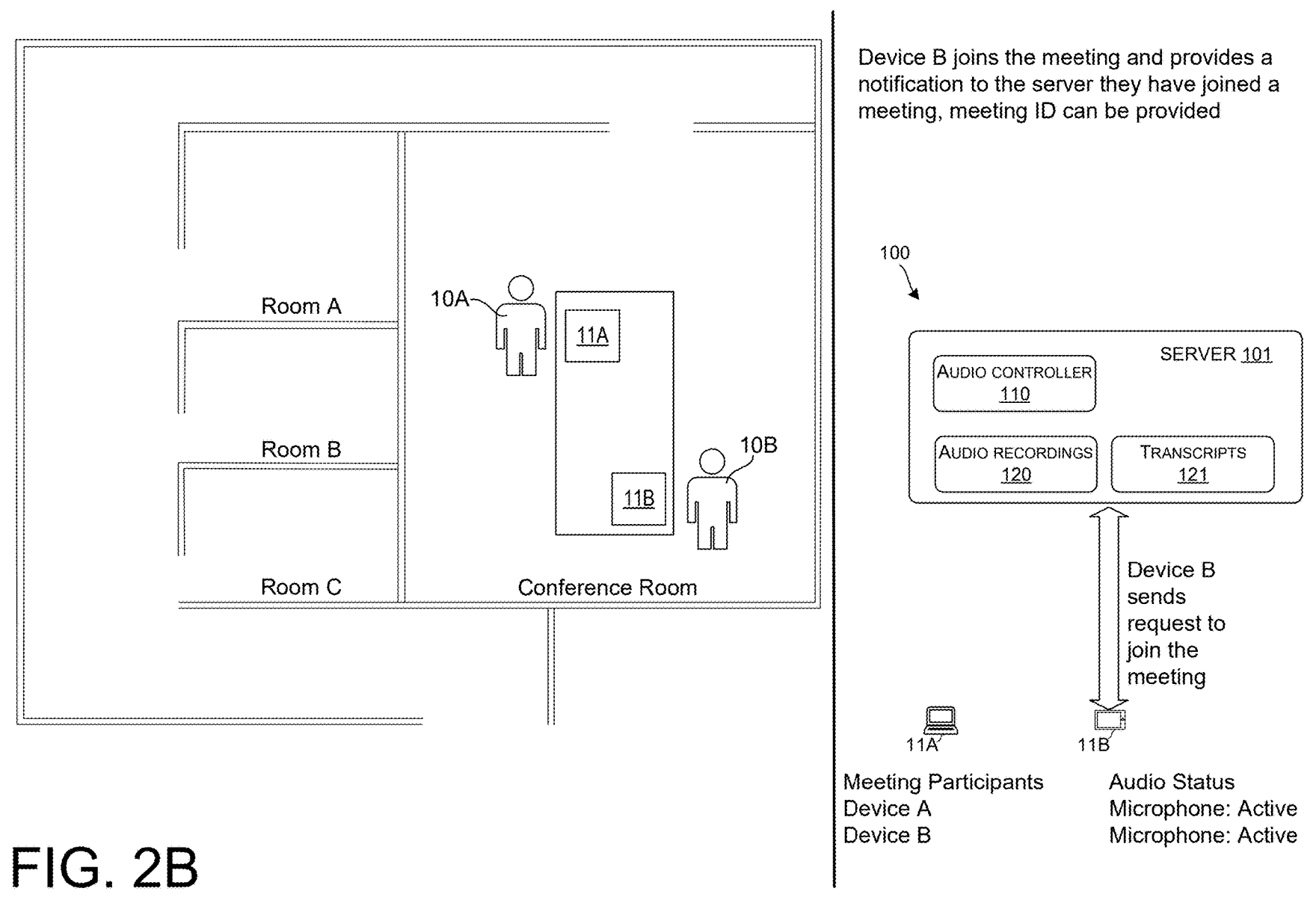

Device B joins the meeting and provides a notification to the server they have joined a meeting, meeting ID can be provided

100

SERVER 101

AUDIO CONTROLLER 110

TRANSCRIPTS 121

AUDIO RECORDINGS 120

Device B sends request to join the meeting

11A

11B

Meeting Participants
Device A
Device B

Audio Status
Microphone: Active
Microphone: Active

Room A

Room B

Room C

11A

11B

10A

10B

Conference Room

FIG. 2B

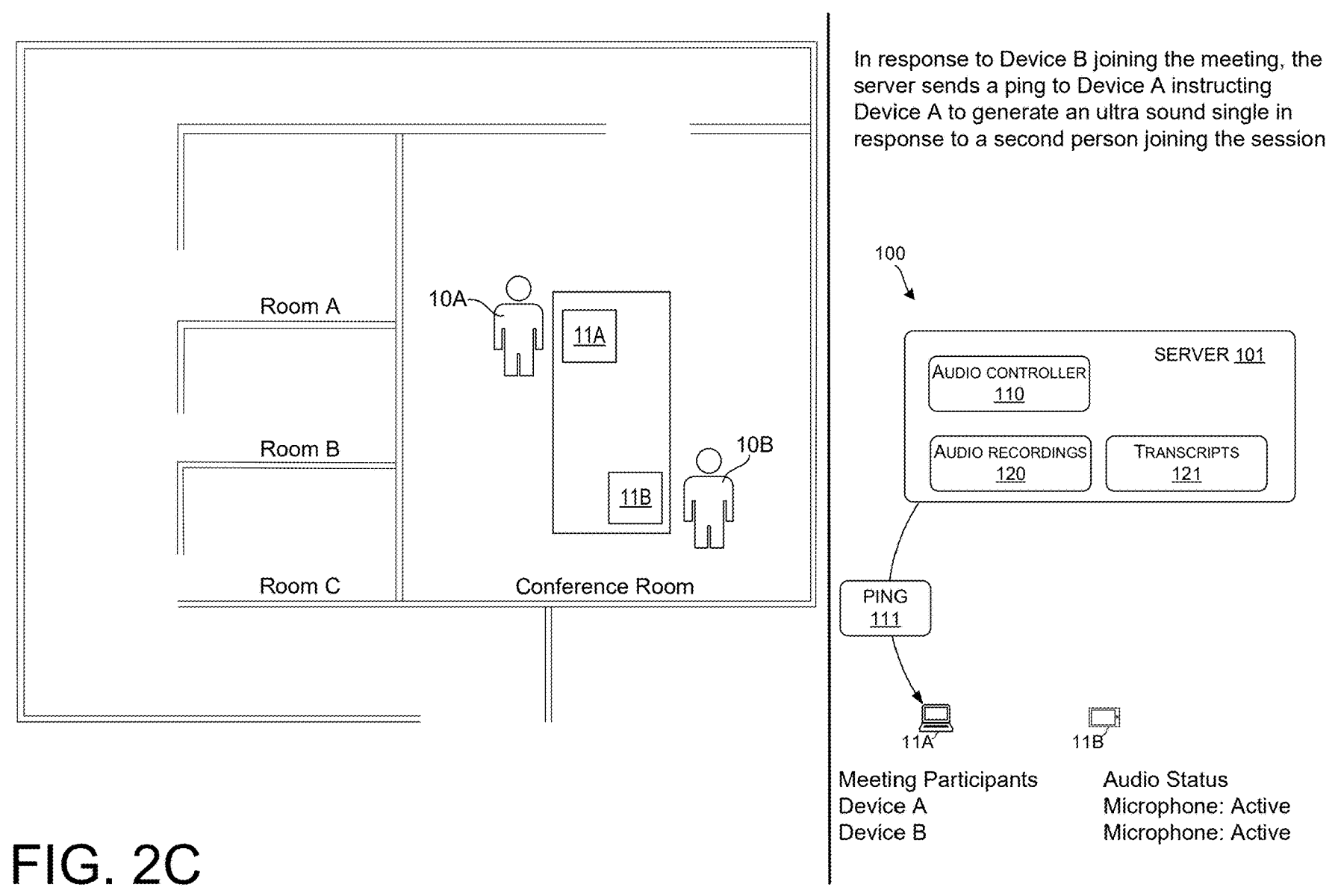

In response to Device B joining the meeting, the server sends a ping to Device A instructing Device A to generate an ultra sound single in response to a second person joining the session

100

SERVER 101

AUDIO CONTROLLER 110

AUDIO RECORDINGS 120

TRANSCRIPTS 121

PING 111

11A

11B

Meeting Participants
Device A
Device B

Audio Status
Microphone: Active
Microphone: Active

Room A

Room B

Room C

10A

10B

11A

11B

Conference Room

FIG. 2C

Device A generates a first ultrasound signal in response to the ping from the server. Device B receives the first ultrasound signal since, in this example, Device B is within a close physical distance to Device A

FIG. 2E

In response to the first ultra sound signal produced by Device A, Device B sends a second ultrasound signal encoded with a Meeting ID and User ID

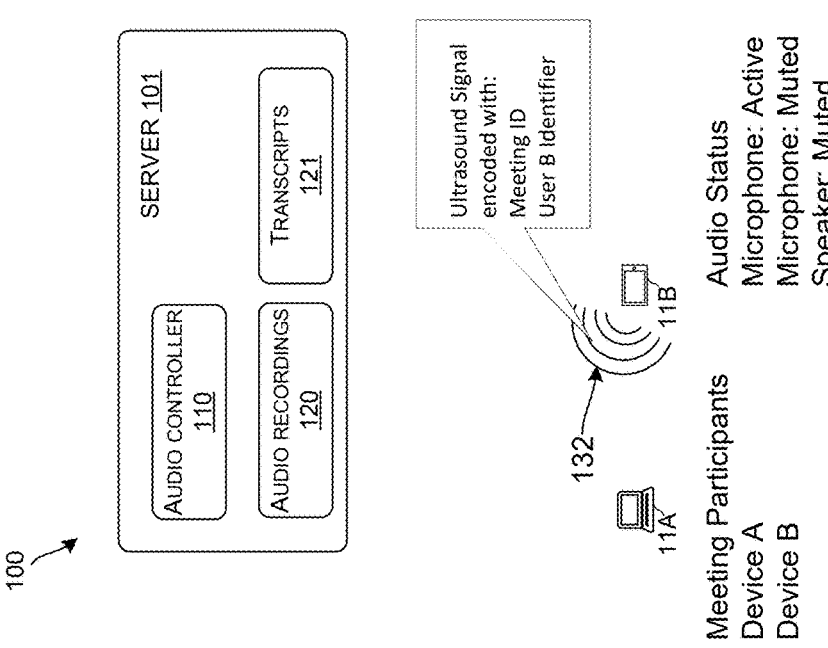

SERVER 101

AUDIO CONTROLLER 110

TRANSCRIPTS 121

AUDIO RECORDINGS 120

100

Ultrasound Signal encoded with:
Meeting ID
User B Identifier

11A

11B

132

Meeting Participants
Device A
Device B

Audio Status
Microphone: Active
Microphone: Muted
Speaker: Muted

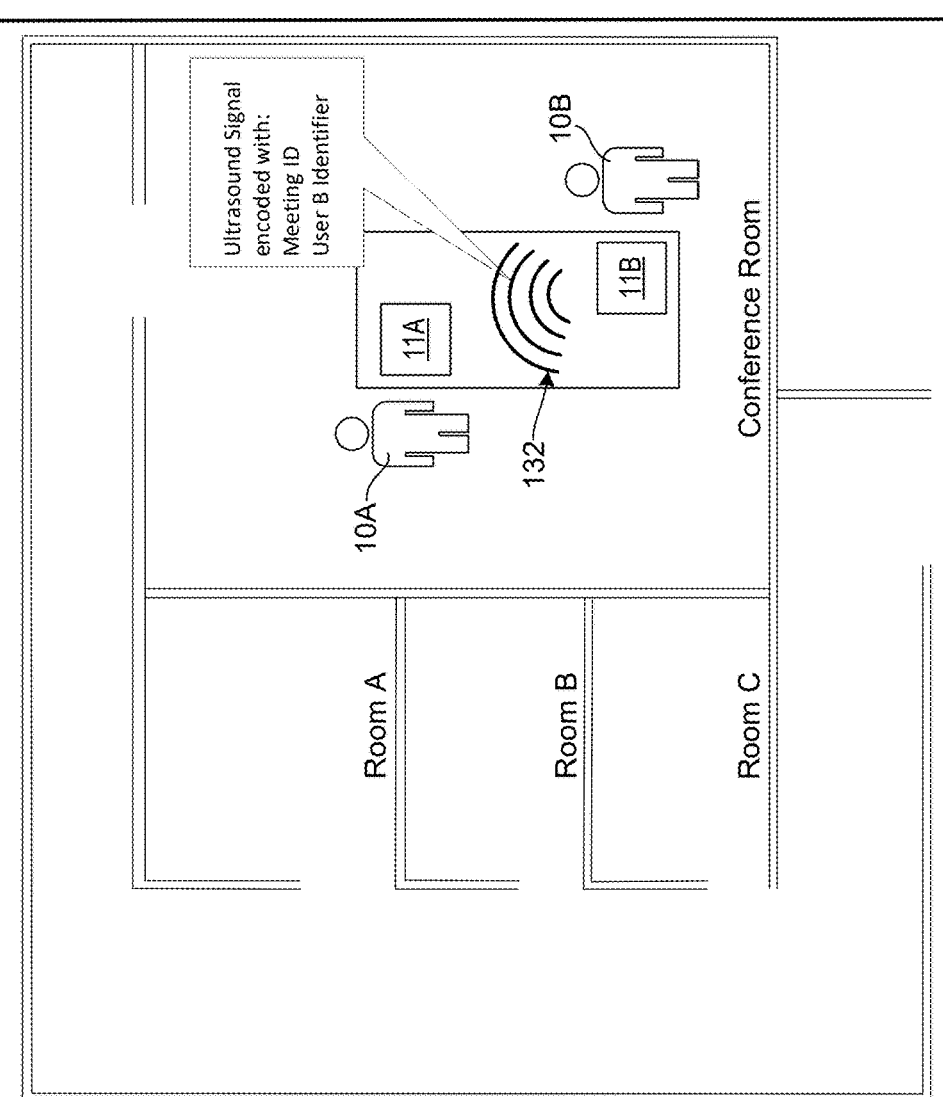

Room A

Room B

Room C

Ultrasound Signal encoded with:
Meeting ID
User B Identifier

11A

11B

10A

132

10B

Conference Room

FIG. 2F

In response to the second ultrasound encoded with a Meeting ID and User ID, Device A sends a confirmation to the server with the Meeting ID and the User ID, which allows the server to verify that the second user is joining the correct meeting.

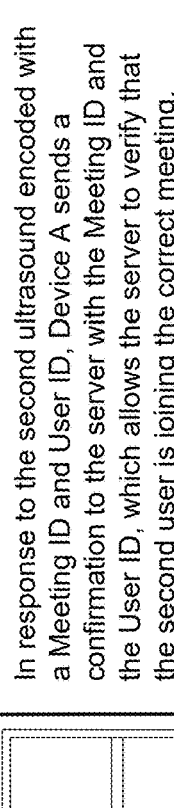

100

SERVER 101

| AUDIO CONTROLLER 110 | TRANSCRIPTS 121 |
| AUDIO RECORDINGS 120 | |

CONFIRMATION 112

11A

11B

Meeting Participants
Device A
Device B

Audio Status
Microphone: Active
Microphone: Muted
Speaker: Muted

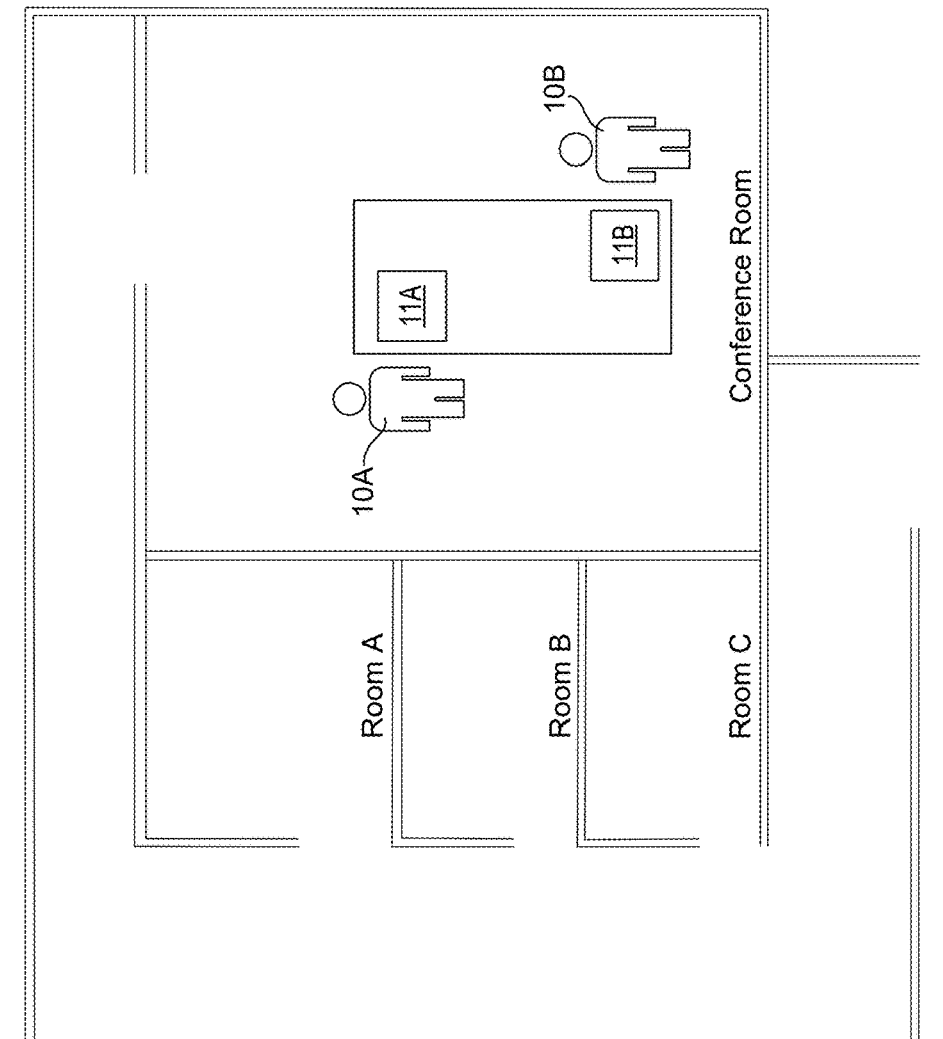

Room A

Room B

Room C

10A

11A

11B

10B

Conference Room

Confirmation has meeting ID and the user id of the ultrasonic sound

FIG. 2G

In response to the confirmation from Device A to the server:

1 The server sends a control signal to prompt or to control Device B to activate its microphone and speaker 2. The server determines that Device A and B are to operate in co-location mode

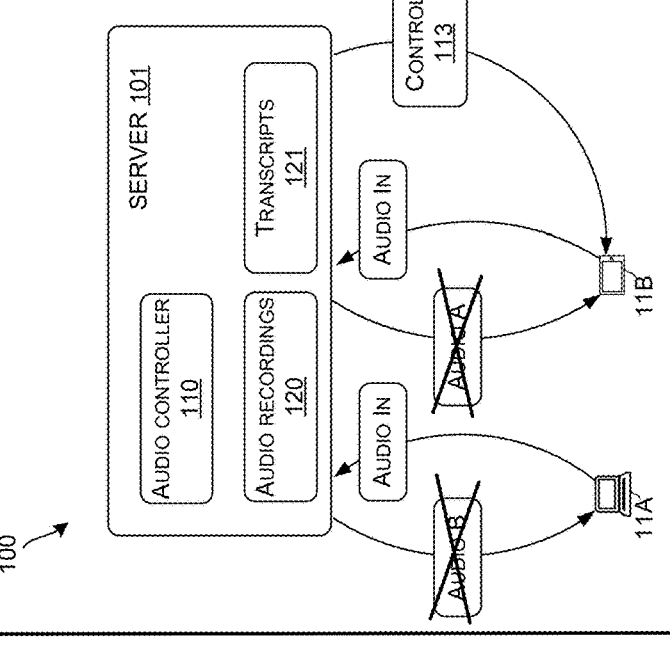

Meeting Participants    Audio Status
Device A            Microphone: Active
Device B            Microphone: Active
                    Speaker: Active Server: Co-location mode for Device A & Device B

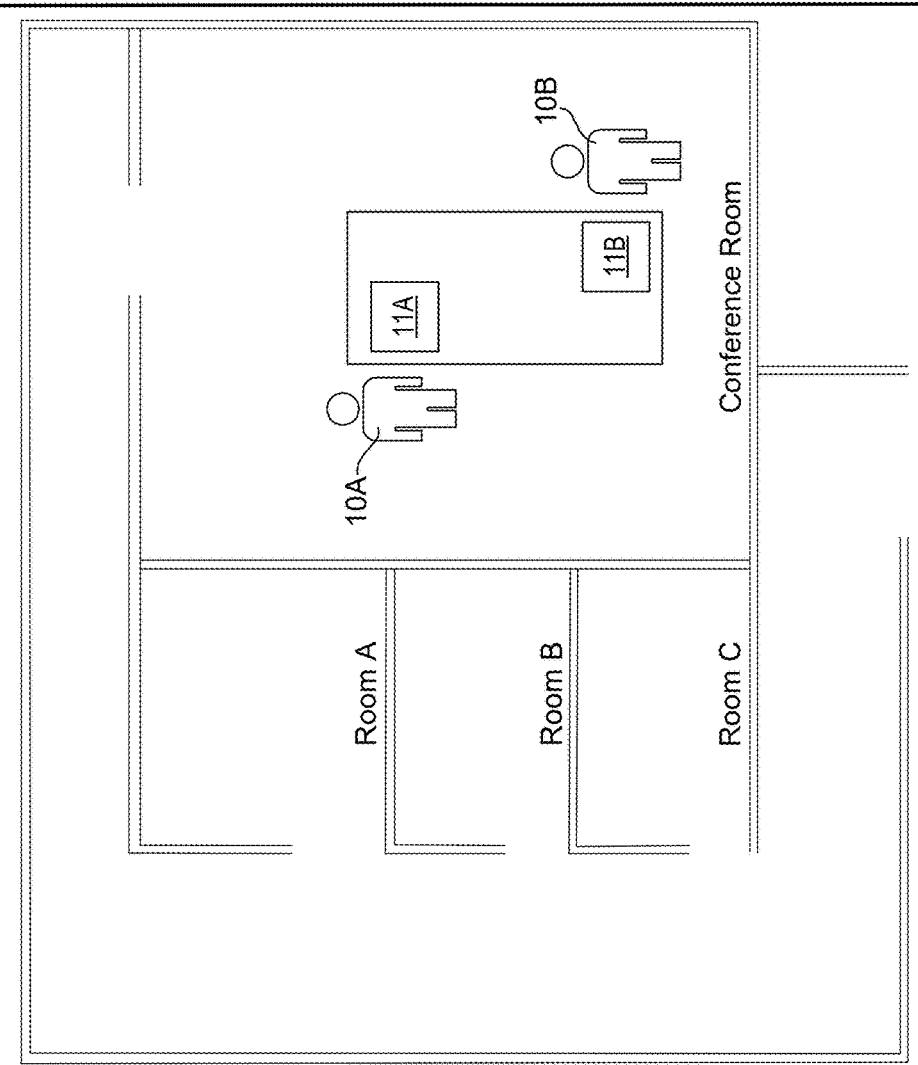

FIG. 2H

Devices A and B are in CO-LOCATION MODE

SERVER 101

AUDIO CONTROLLER 110

TRANSCRIPTS 121

AUDIO RECORDINGS 120

AUDIO IN

AUDIO IN

100

AUDIO B

AUDIO A

11A

11B

| Meeting Participants | Audio Status |
| --- | --- |
| Device A | Co-Location Mode |
| Device B | Co-Location Mode |

Room A

Room B

Room C

10A

11A

11B

10B

Conference Room

FIG. 3A

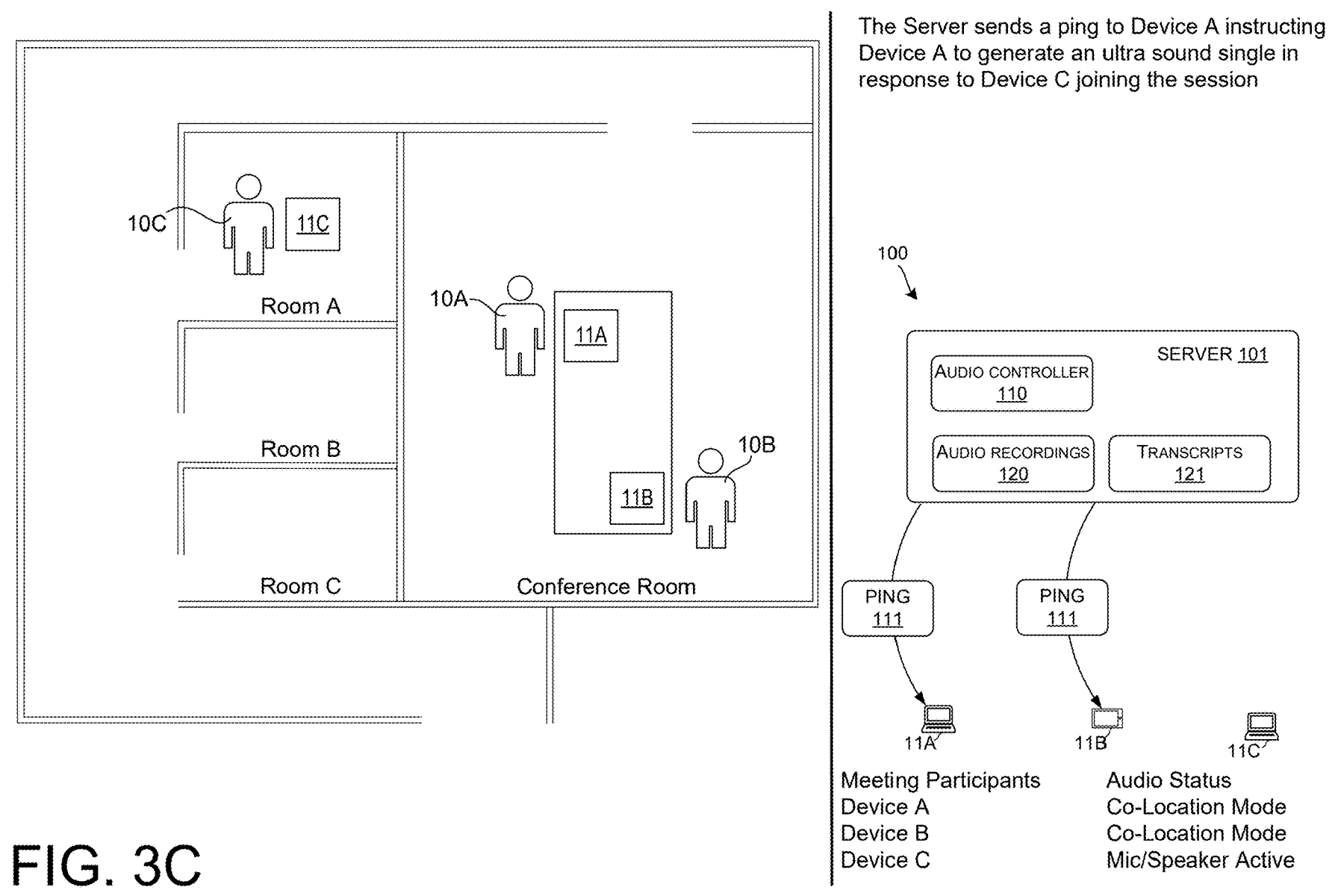

The Server sends a ping to Device A instructing Device A to generate an ultra sound single in response to Device C joining the session

100

SERVER 101

AUDIO CONTROLLER 110

AUDIO RECORDINGS 120

TRANSCRIPTS 121

PING 111

PING 111

11A

11B

11C

Meeting Participants        Audio Status
Device A                    Co-Location Mode
Device B                    Co-Location Mode
Device C                    Mic/Speaker Active

10C

11C

Room A

Room B

Room C

10A

11A

11B

10B

Conference Room

FIG. 3C

Device A generates a first ultrasound signal in response to the ping from the server.

Device C does not respond to the signal since it is in the other room. Device C is in listening mode after it sends the request to join the meeting.

Device B does not respond because it is not in listening mode.

SERVER 101

AUDIO CONTROLLER 110

TRANSCRIPTS 121

AUDIO RECORDINGS 120

131

11A  11B  11C

Meeting Participants       Audio Status
Device A                   Co-Location Mode
Device B                   Co-Location Mode
Device C                   Mic/Speaker Active

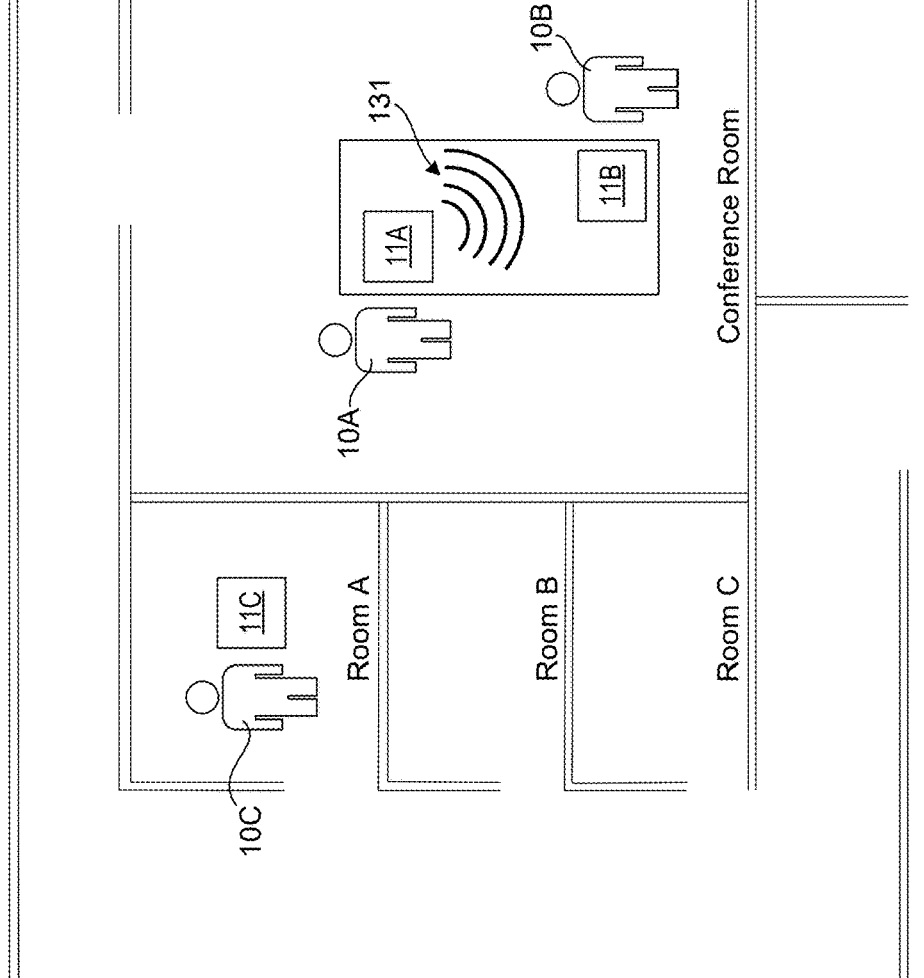

131

11A
11B

10A

10B

Conference Room

10C

11C

Room A

Room B

Room C

FIG. 3D

In response to the first ultrasound signal from Device A:

Device B takes no action from the ping since it is already in CO-LOCATION MODE

Device C does not receive the ultrasound signal since it is in another room and out of range for receiving an audible signal from Device A, Device C remains in standard mode with mic and speaker

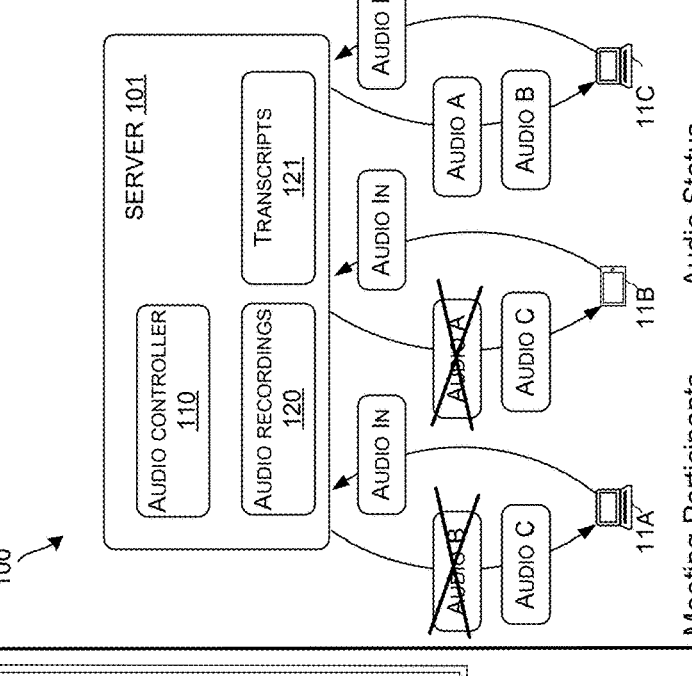

SERVER 101

AUDIO CONTROLLER 110

TRANSCRIPTS 121

AUDIO RECORDINGS 120

AUDIO IN

AUDIO IN

AUDIO IN

AUDIO A    AUDIO B    11C

AUDIO A    AUDIO C    11B

AUDIO B    AUDIO C    11A

100

| Meeting Participants | Audio Status |
|---|---|
| Device A | Co-Location Mode |
| Device B | Co-Location Mode |
| Device C | Mic/Speaker Active |

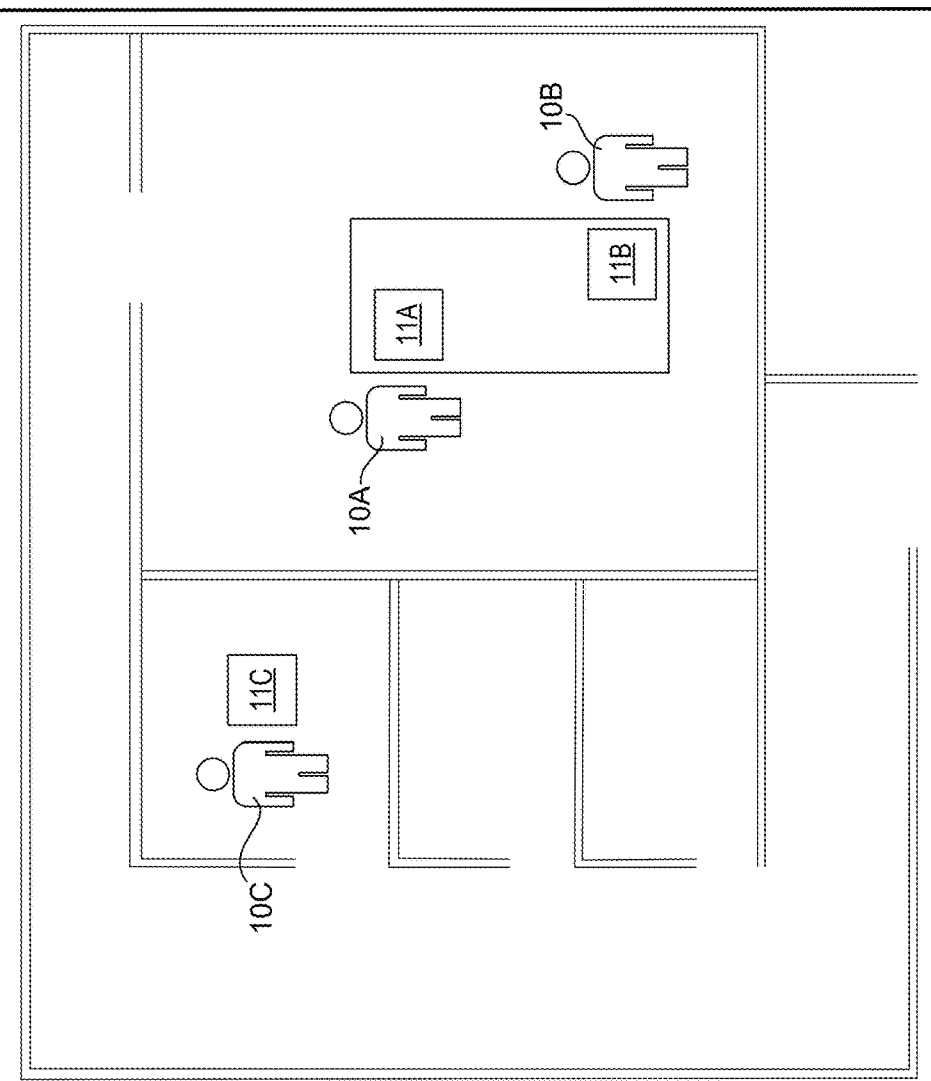

Figure 4A:
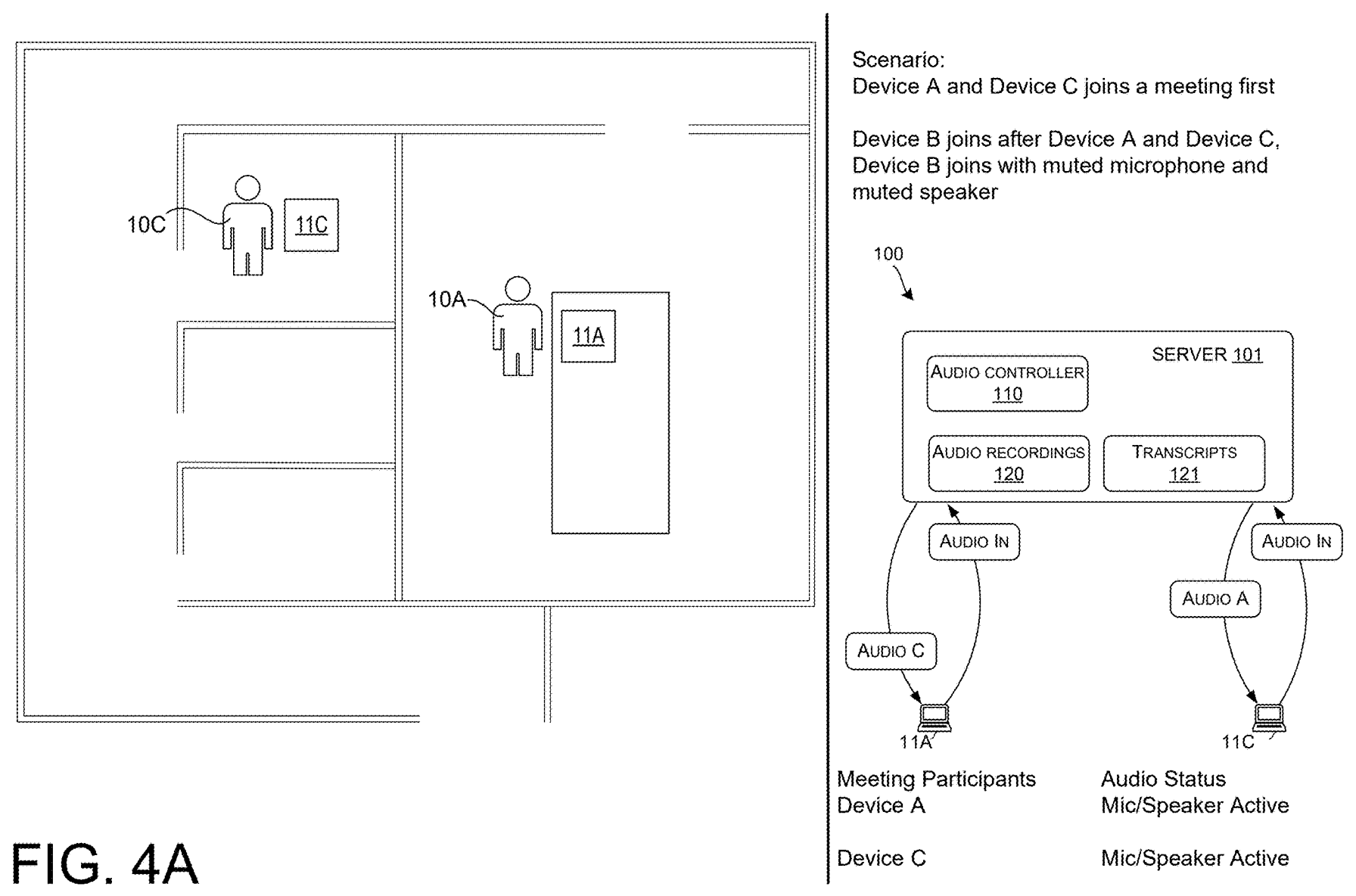

Scenario:
Device A and Device C joins a meeting first

Device B joins after Device A and Device C,
Device B joins with muted microphone and
muted speaker

SERVER 101

AUDIO CONTROLLER 110

TRANSCRIPTS 121

AUDIO RECORDINGS 120

AUDIO IN

AUDIO IN

AUDIO A

AUDIO C

11C

11A

100

| Meeting Participants | Audio Status |
|---|---|
| Device A | Mic/Speaker Active |
| Device C | Mic/Speaker Active |

When Device B sends a request to join a meeting with a muted microphone and a muted speaker, Device B sends an ultrasound signal encoded with the meeting ID and User ID When Device B joins a meeting with a muted microphone and speaker, the server does not send a ping to existing session participants.

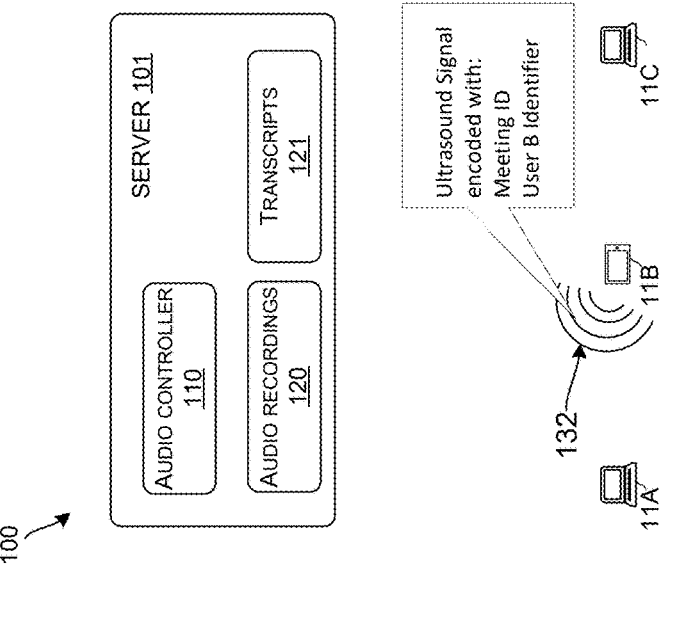

SERVER 101

AUDIO CONTROLLER 110

TRANSCRIPTS 121

AUDIO RECORDINGS 120

100

Ultrasound Signal encoded with:
Meeting ID
User B Identifier

132

11A   11B   11C

Meeting Participants          Audio Status
Device A                      Mic/Speaker Active
Device B                      Microphone Muted
Device C                      Mic/Speaker Active

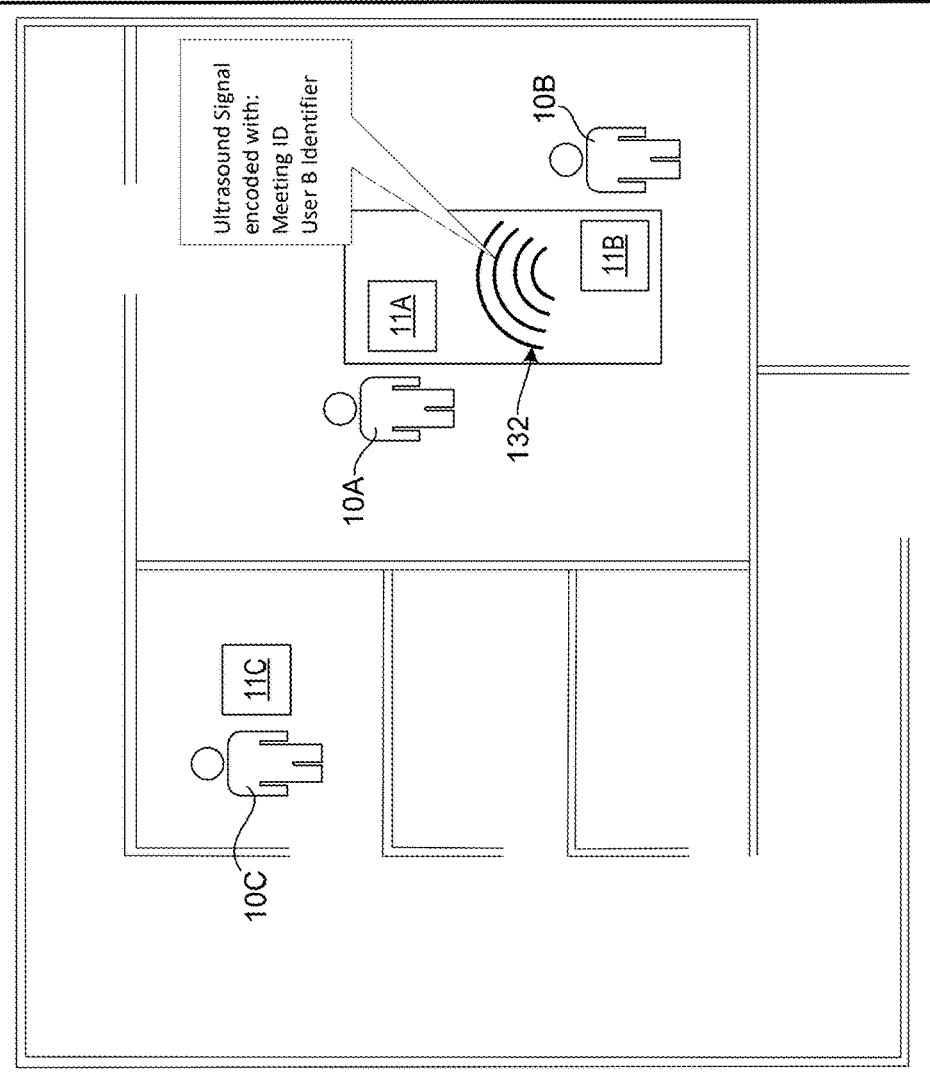

10C
11C

Ultrasound Signal encoded with:
Meeting ID
User B Identifier

In response to ultrasound signal encoded with the meeting ID and User ID from Device B, Device A sends a confirmation to the server indicating receipt of the ultrasound signal with Meeting ID and User ID received from Device B Device C does not have a response to the ultrasound signal encoded from Device B since it was in the other room and out of range from receiving an audible signal.

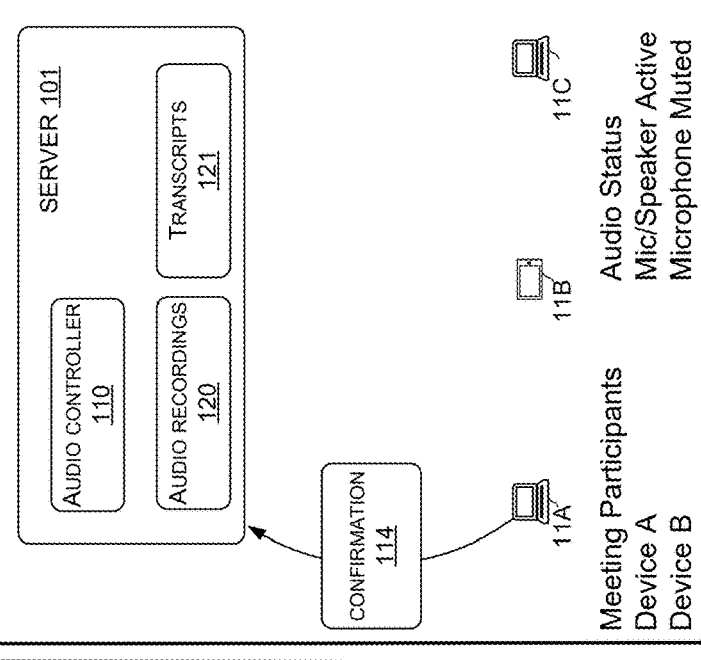

SERVER 101

AUDIO CONTROLLER 110

TRANSCRIPTS 121

AUDIO RECORDINGS 120

CONFIRMATION 114

11A    11B    11C

Meeting Participants
Device A
Device B
Device C

Audio Status
Mic/Speaker Active
Microphone Muted
Mic/Speaker Active

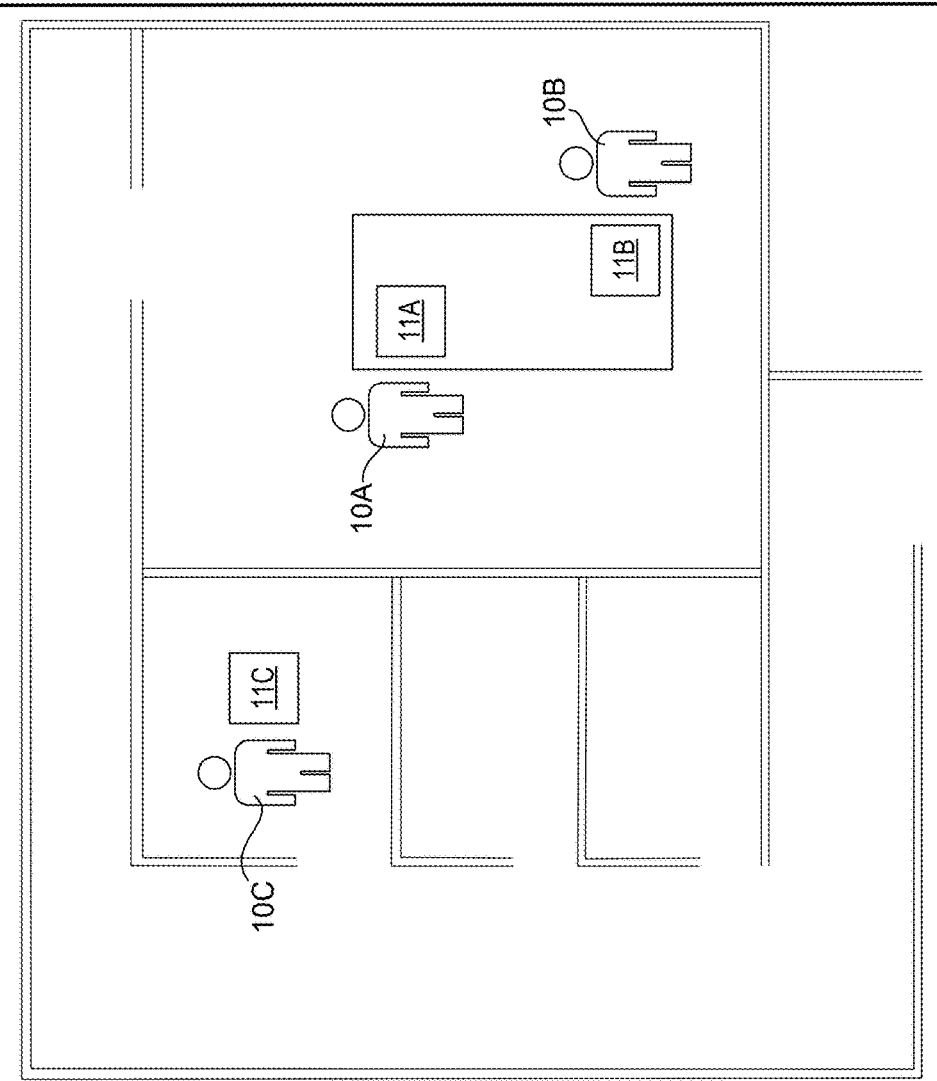

The server response to the confirmation from Device A and sends a verification to Device A and Device B they are co-located, and the server operates those devices in CO-LOCATION MODE.

The server also sends a control signal to Device B to unmute the microphone.

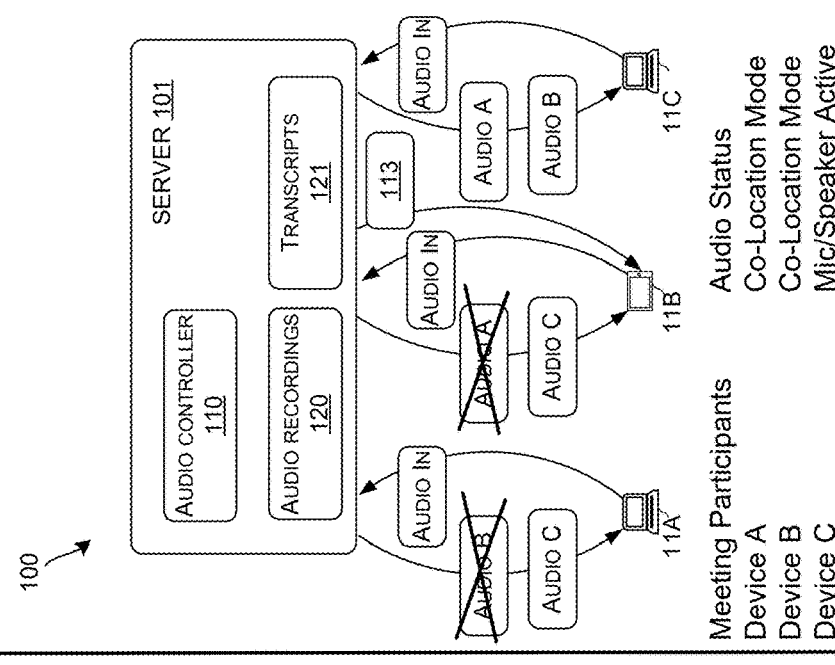

| SERVER 101 | | |
|---|---|---|
| AUDIO CONTROLLER 110 | TRANSCRIPTS 121 | 113 |
| AUDIO RECORDINGS 120 | | |

Meeting Participants　　Audio Status
Device A　　　　　　　Co-Location Mode
Device B　　　　　　　Co-Location Mode
Device C　　　　　　　Mic/Speaker Active

FIG. 4E

ENHANCED TECHNIQUES FOR REDUCING AUDIO FEEDBACK DURING COMMUNICATION SESSIONS

BACKGROUND

There are a number of different types of collaborative systems that allow users to communicate. For example, some systems allow people to collaborate by sharing content using video and audio streams, shared files, chat messages, etc. Some systems manage communication sessions, which are also referred to herein as online meetings, virtual reality sessions, broadcasts, etc. Such sessions are also referred to as events that have a distinct start time and an end time that occur on specific dates. People can schedule these sessions on a calendar and have a number of events scheduled throughout the day.

Although some systems can provide a number of features that allow people to collaborate, such systems have a number of drawbacks. For example, when two people are in a room together and use two different devices to participate in a virtual meeting to communicate with other participants outside of the room, the two users can experience an undesirable result when the audio systems of each device start to generate audio feedback. This can produce disturbing sounds that cannot be mitigated until the users mute their microphones and/or speakers.

To address some of the feedback issues described above, some existing systems provide techniques that disable microphones for client devices that are co-located. Some existing solutions include the user of a proximity sensor to automatically mute one or more computers when they are located in the same room. However, by muting the microphones for some or all of the computers in a room, other major drawbacks are introduced. Very often, disabling microphone alone is not sufficient to avoid feedback. This solution often leads to unwanted feedback due to multiple computers being at one location.

Another issue with some of the existing solutions is that each person cannot be heard clearly in a meeting if their computer is muted. For instance, if four people are in a room and three of the four computers are muted, that arrangement may lead to a situation where only one person is positioned in front of the computer with an active microphone. This arrangement may lead to a situation where the other three users who are not located in front of an active microphone are not heard by the other remote participants. In addition, the users who are positioned in front of computers with muted microphones cannot be properly included in transcripts and meeting recordings. This means that they may be inadvertently omitted from meeting records and important content generated from those records. Yet further, if meeting records are used by AI technologies to generate tasks and summaries, the system cannot accurately include the input of the participants who are near muted microphones.

Incomplete meeting records also cause other efficiencies with respect to computing resources. Other computing resources may have to be used to compensate for the missed information or inaccurate records. For example, meetings may be prolonged to identify a source of missed information or people may have to use other means of communication, e.g., phone calls or emails, to rectify the above-described shortcomings.

SUMMARY

The disclosed techniques provide enhanced techniques for reducing audio feedback during communication sessions. A system utilizes beacon signals to determine if two or more client devices are co-located. The system utilizes two different beacon signal protocols depending on an operating state of the microphone and speaker of a device joining a meeting. For example, if a device joins a meeting with an active microphone, the system causes a device that is already in the meeting to emit a first beacon. If the device joining the meeting is in proximity to receive the first beacon, the joining device emits a second beacon encoded with a meeting identifier and a user identifier. The second beacon is received by the device that is already in the meeting, and the meeting identifier and user identifier are communicated to a server to determine if the two devices are co-located. In another example, if the joining device has a muted microphone and a muted speaker, the system only uses a single beacon signal from the device joining the meeting to determine if the devices are co-located. By using two different beacon signal protocols, a system can improve its efficiency and reduce the time required for a device to join a meeting. Once two or more client devices are determined to be co-located, the system sends a request to each device to confirm that they should operate in a co-location mode, or the system can automatically transition to the co-location mode without user confirmation. The co-location mode causes the system to activate the microphones of each co-located client devices to allow each device to contribute audio content to a meeting for use in transcripts, recordings, meeting summaries, and verbal commands, while also mitigating feedback by preventing the co-located devices from sharing audio signals between one another.

In one illustrative example, consider a scenario where a first user of a first device is in a virtual meeting and a second user of a second device wants to join that meeting while in the same room as the first user. The second device sends a request to the server to join the meeting while the microphone of the second device is active, e.g., not muted. In response, the server sends a ping, e.g., a command, to the first device causing the first device to generate a first beacon signal, which can be an ultrasound signal. Since the second device is in the same room as the first device, e.g., within an audible range, the second device receives the first ultrasound signal and responds by muting its microphone. The second device also responds to the first beacon signal and generates a second beacon signal. The second beacon signal is encoded with a meeting identifier and a user identifier. Since the first device is in proximity to the second device, the first device receives the second beacon signal and sends a confirmation to the server with the meeting identifier and the user identifier that originated from the second device via the second beacon signal. The server determines if the session identifier (Meeting ID) and a user identifier that originated from the second device are valid. If the validation is successful, the server prompts the two devices to confirm that they are co-located. In some embodiments, the server can automatically determine that the two devices are co-located after the validation of the identifiers. Once the two devices are determined to be co-located, the system invokes a co-location mode where the server re-activates the microphone of the second device and receives independent audio streams from both client devices for inclusion in the communication session. This means that the audio streams of each of the co-located devices are communicated to other remote participants of the meeting and the audio stream of each of the co-located devices are included in the meeting transcripts and recordings. Also, in co-location mode, the server restricts a first audio stream generated by the first device from being communicated to the second device and concurrently restricts a second audio stream generated by the second device from being communicated to the first device to reduce audio feedback generated by the first device and the second device.

In another illustrative example, consider a scenario where the first user of the first device is in a virtual meeting and the second user of the second device wants to join that meeting while in the same room as the first user. However, in this particular example, the second device sends a request to the server to join the meeting while the microphone and the speaker of the second device are both muted. In such embodiments, disabling both the microphone and speaker is a more effective solution than just muting the microphone or just muting the speaker individually. In this scenario, when the joining device reports a mute state where both the microphone and speaker are muted, the server still sends a ping to the first device causing the first device to generate a first beacon signal. But in addition, in response to detecting that the microphone and the speaker of the second device are both muted, the second device also generates an encoded beacon signal. The encoded beacon signal includes a meeting identifier and a user identifier. Since the first device is in proximity to the second device, the first device receives the encoded beacon signal and sends a confirmation to the server with the meeting identifier and the user identifier that originated from the second device via the encoded beacon signal. The server determines if the session identifier and a user identifier that originated from the second device are valid. If the validation is successful, the server prompts the two devices to confirm that that they are co-located. In some embodiments, the server can automatically determine that the two devices are co-located after the validation of the identifiers. Once the two devices are determined to be co-located, the system invokes a co-location mode where the server re-activates the microphone of the second device and receives independent audio streams from both client devices for inclusion in the communication session. The audio stream of each of the co-located devices are communicated to other remote participants of the meeting and the audio stream of each of the co-located devices are included in the meeting transcripts and recordings. Also, in co-location mode, the server restricts a first audio stream generated by the first device from being communicated to the second device and concurrently restricts a second audio stream generated by the second device from being communicated to the first device to reduce audio feedback generated by the first device and the second device. By sending this signal from the second device with a muted microphone and speaker, this second approach is faster than the first approach, since the second device does not need to wait for detecting the first ultra-sound beacon.

In another example scenario, when the joining device does not report a mute state, or reports a mute state where only the microphone is muted or the speaker is muted, the system utilizes the embodiment, where the server causes at least one of the devices that are already in the meeting to emit a first beacon signal. In one specific example, in response to a joining device that is not reporting a mute state, or with only one of the microphone or speaker muted, the server sends a ping, e.g., a command, to a first device that is already in the meeting causing that first device to generate a first beacon signal, which is not encoded with data. Since the joining device is in the same room as the first device, e.g., within an audible range, the joining device receives the first ultrasound signal and responds by muting its microphone. The second device also responds to the first beacon signal and generates a second beacon signal that is encoded with the meeting ID and User ID. In this example, the first device receives that second beacon signal and and sends a confirmation to the server with the meeting identifier and the user identifier that originated from the second device via the second beacon signal. The server determines if the session identifier and a user identifier that originated from the joining device are valid. If the validation is successful, the server prompts the two devices to confirm that they are co-located. In some embodiments, the server can automatically determine that the two devices are co-located after the validation of the identifiers. Once the two devices are determined to be co-located, the system invokes a co-location mode where the server re-activates the microphone of the joining device and receives independent audio streams from both client devices for inclusion in the communication session. This means that the audio streams of each of the co-located devices are communicated to other remote participants of the meeting and the audio stream of each of the co-located devices are included in the meeting transcripts and recordings. Also, in co-location mode, the server restricts a first audio stream generated by the first device from being communicated to the joining device and concurrently restricts a second audio stream generated by the joining device from being communicated to the first device to reduce audio feedback generated by the first device and the joining device.

The disclosed techniques address the technical issues pertaining to unwanted feedback and shortcomings of incomplete meeting records by providing technical solutions that utilize different beacon signal protocols based on the detection of the operating state of one of the client computers meeting one or more criteria, e.g., the second device having a muted or unmuted microphone or speaker. The disclosed techniques address the technical issues pertaining to unwanted feedback and shortcomings of incomplete meeting records by providing technical solutions that utilize a co-location mode that utilizes the microphone of each computer that is co-located in a room. Such embodiments eliminate the need for a system to send a complex beacon signal each time a person attempts to join a meeting. Specifically, the disclosed techniques can reduce the amount of time a system takes to validate a person's request to join a meeting. In addition, the disclosed techniques can increase the system's security since the meeting identifier and the user identifier are only broadcasted in response to the detection of one or more predetermined conditions.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2B shows a phase of a process where a device sends a request to join a meeting with an unmuted microphone while two other devices are communicating a meeting in co-location mode.

FIG. 2C shows a phase of a process where a first device receives a command to emit a beacon signal in response to a request from a second device to join a meeting.

FIG. 2E shows a phase of a process where the second device mutes a microphone and a speaker in response to receiving the beacon signal.

FIG. 2F shows a phase of a process where the second device emits a second beacon signal in response to receiving the first beacon signal.

FIG. 2G shows a phase of a process where the first device sends a command to the server, which causes the server to verify the credentials received in the second beacon signal.

FIG. 2H shows a phase of a process where the server enters a co-location mode for the first device and the second device in response to verifying the credentials received from the command sent from the first device.

FIG. 3A shows a first phase of a process before a device sends a request to join a meeting with an unmuted microphone while a first device and a second device are communicating a meeting in co-location mode.

FIG. 3C shows a second phase of a process where a first device receives a command to emit a beacon signal in response to a third device requesting to join a meeting while two other devices are in co-location mode.

FIG. 3D shows a third phase of a process where a first device emits a beacon signal in response to a command received from the server.

FIG. 3E shows a phase of a process resulting from the beacon signal from the from the first device, where the second device does not take action from beacon ping since it is already in co-location mode, and the third device does not receive the ultrasound signal since it is in another room.

FIG. 4A shows a state of a system where a first device and a third device are in a meeting.

FIG. 4C shows a state of a system where a second device emits a beacon signal having encoded meeting data.

FIG. 4D shows a state of a system where a first device 11A receives an encoded in the beacon signal sent from a second device.

FIG. 4E shows a state of a system where a server determines the validity of received identifiers, unmutes a microphone and speaker of a second device and invokes a co-location mode.

DETAILED DESCRIPTION

Figure 1:
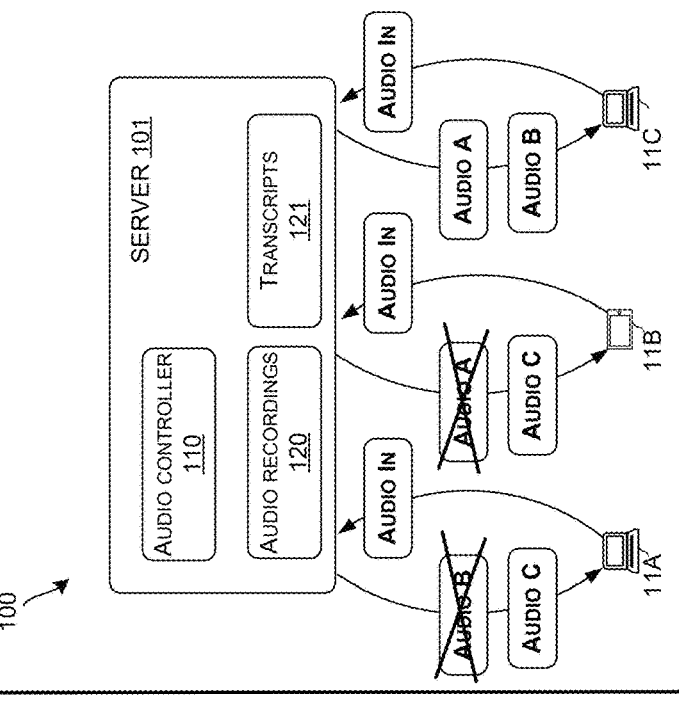
FIG. 1 is a block diagram of a system for providing enhanced techniques for reducing audio feedback during communication sessions.
Figure 1:
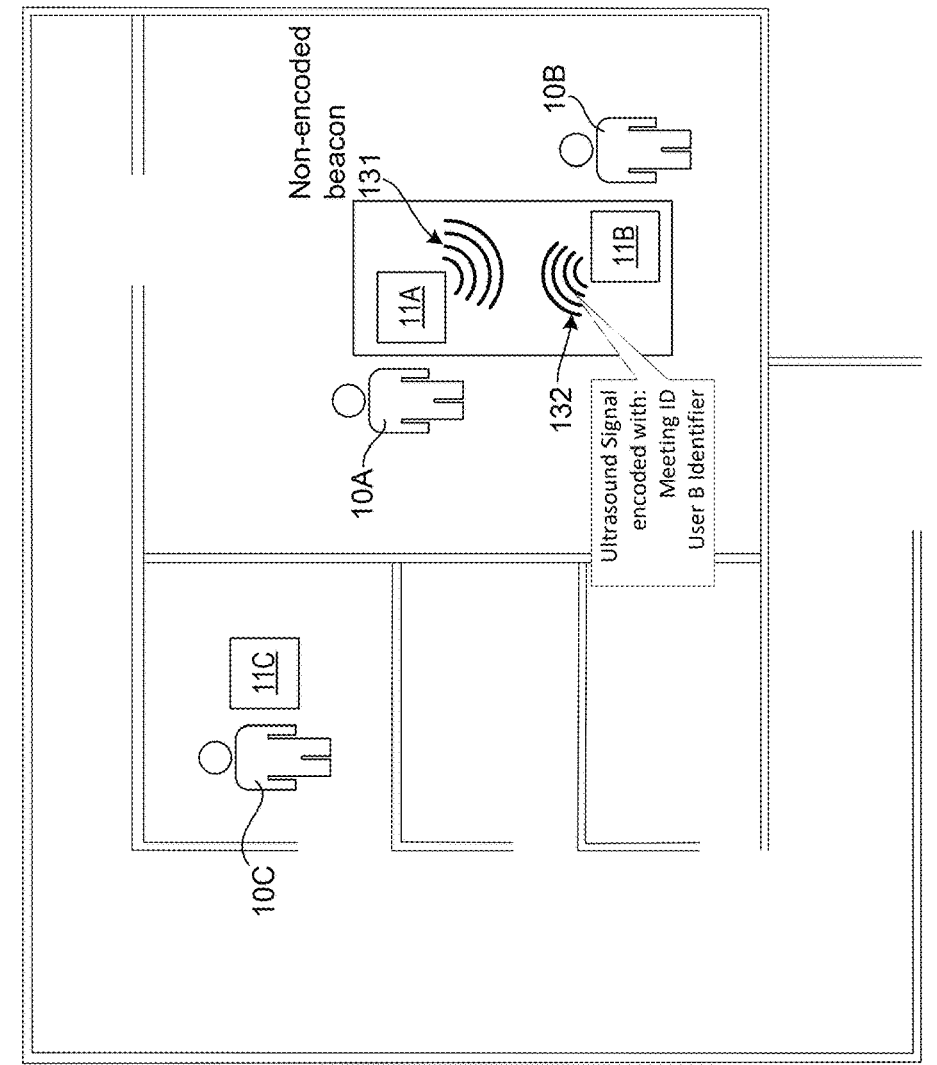

FIG. 1 illustrates a system 100 that provides enhanced techniques for reducing audio feedback during communication sessions. In this example, the system 100 includes a number of client devices 11 each operated by an associated user 10. The client devices 11 are also configured to communicate with a server 101 that includes an audio controller 110 for controlling input audio streams from each client device 11 for use in meeting content such as audio recordings 120 and transcripts 121. The controller also controls the distribution of each audio stream of each client device to other client devices.

A system utilizes beacon signals for determining if two or more client devices 11 are co-located. The system utilizes two different beacon signal protocols depending on an operating state of the microphone and speaker of a device 11B joining a meeting. For example, if a device 11B joins a meeting with an active microphone, the system causes a device 11A that is already in the meeting to emit a first beacon 131. If the device 11B joining the meeting is in proximity to receive the first beacon 131, the joining device 11B emits a second beacon 132 encoded with a meeting identifier and a user identifier. The second beacon 132 is received by the device 11A that is already in the meeting, and the meeting identifier and user identifier are communicated to a server 101 to determine if the two devices 11A and 11B are co-located. In another example, if the joining device 11B has a muted microphone and a muted speaker, the system only uses a single beacon signal 132 from the device 11B joining the meeting to determine if the devices are co-located. By using two different beacon signal protocols, a system can improve its efficiency and reduce the time required for a device to join a meeting. Once two or more client devices are determined to be co-located, the server 101 sends a request to each device to confirm that they should operate in a co-location mode, or the server 101 can automatically transition to the co-location mode without user confirmation.

The co-location mode causes the server 101 to activate the microphones of each co-located client devices to allow each device to contribute audio content to a meeting for use in transcripts, recordings, and verbal commands, while also mitigating feedback by preventing the co-located devices from sharing audio signals between one another. As shown, when two devices 11A and 11B are determined to be co-located, the system activates the microphones of each co-located client devices to allow each device to contribute audio content to a meeting for use in transcripts, recordings, and verbal commands, while also preventing the co-located devices 11A and 11B from sharing audio signals between one another to mitigate feedback between those devices. For other remote devices, such as device 11C, the system includes the input audio stream from such devices for use in the meeting content, e.g., audio recordings 120 and transcripts 121, and also shares that input audio stream with the co-located devices 11A and 11B.

Referring now to FIGS. 2A-2H, an example of a process for identifying co-located devices is shown and described below. In this example, a person is joining a meeting with their microphone and/or their speaker activated, e.g., unmuted.

Figure 2A:
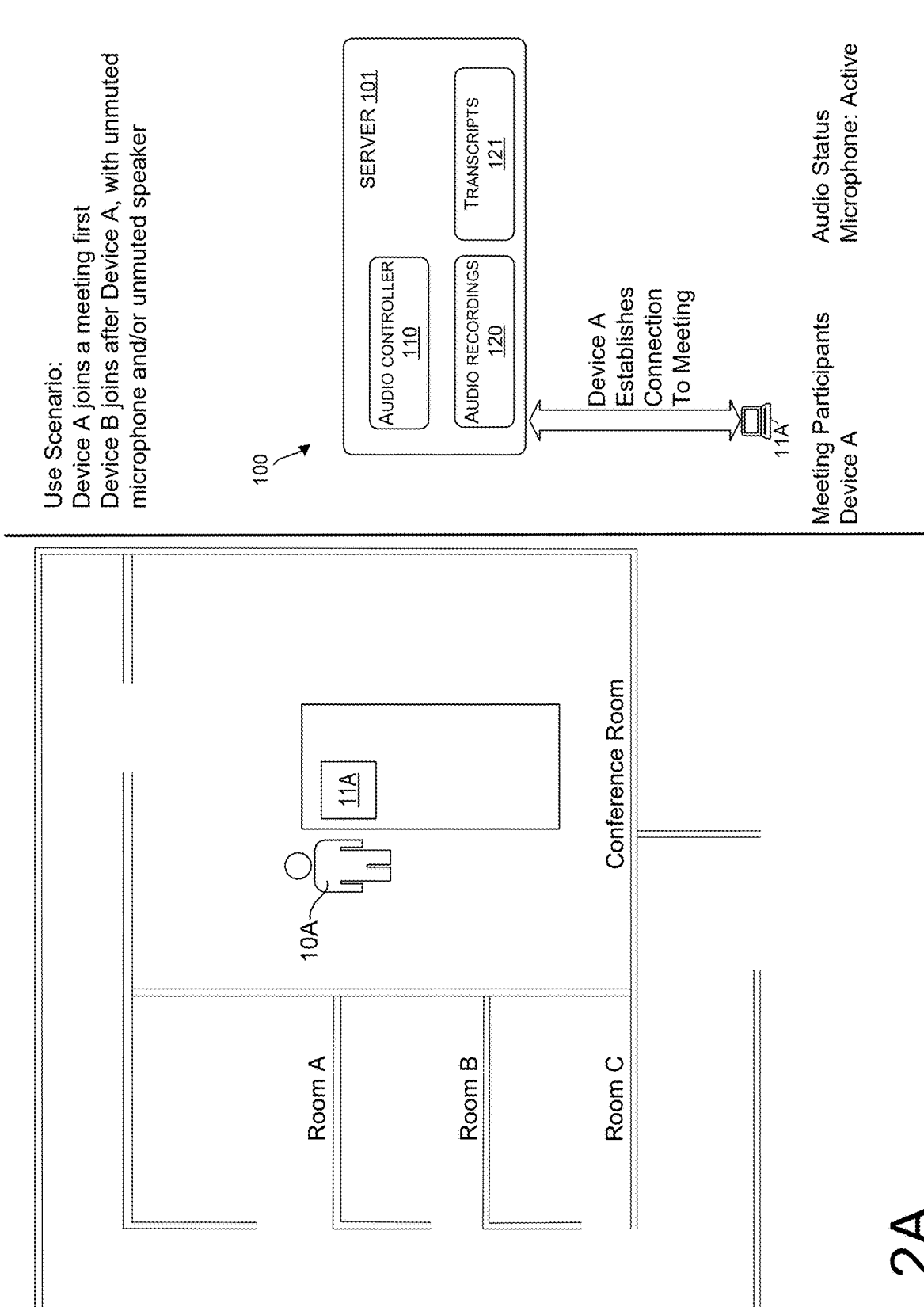
FIG. 2A shows a phase of a process before a device sends a request to join a meeting with an unmuted microphone while two other devices are communicating a meeting in co-location mode.

FIG. 2A shows a phase in the process where the first device 11A associated with the first user 10A establishes a connection with the server to join a communication session, e.g., an online meeting. This is to show that the first device 11A is a device that is already a participant of the meeting when the second device 11B sends a request to join the meeting. As shown in FIG. 2B, the second device 11B sends a request to join the meeting. In this example, the second device 11B sends the request to the server with the microphone and/or speaker in an unmuted state. Also, as shown the first device 11A and the second device 11B are in the same room. At the server, this includes receiving a request from the second device 11B to join the communication session associated with a session identifier, e.g., a meeting identifier (ID). Then, as shown in FIG. 2C, in response to second device 11B joining the meeting, the server sends a ping (a "command") to the first device 11A instructing the first device 11A to generate a beacon signal.

Figure 2D:
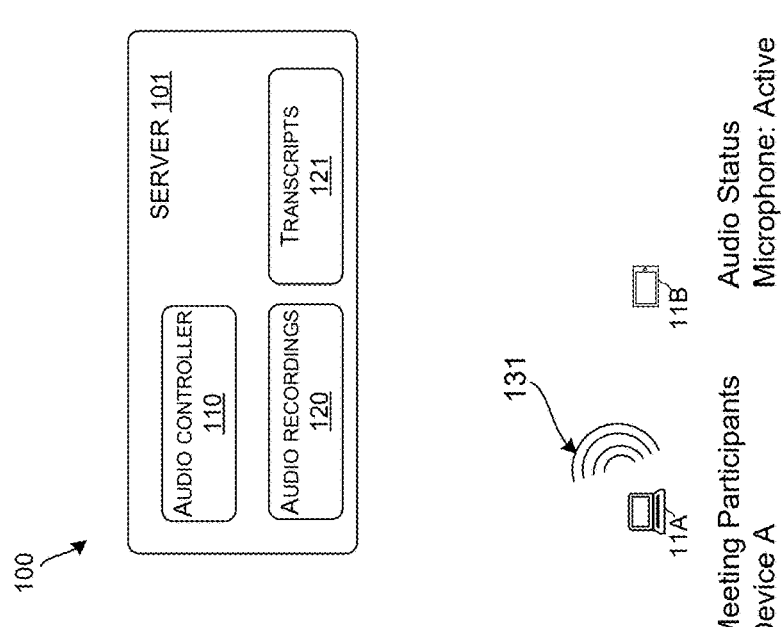
FIG. 2D shows a phase of a process where a first device emits a first beacon signal in response to a command received from the server.
Figure 2D:
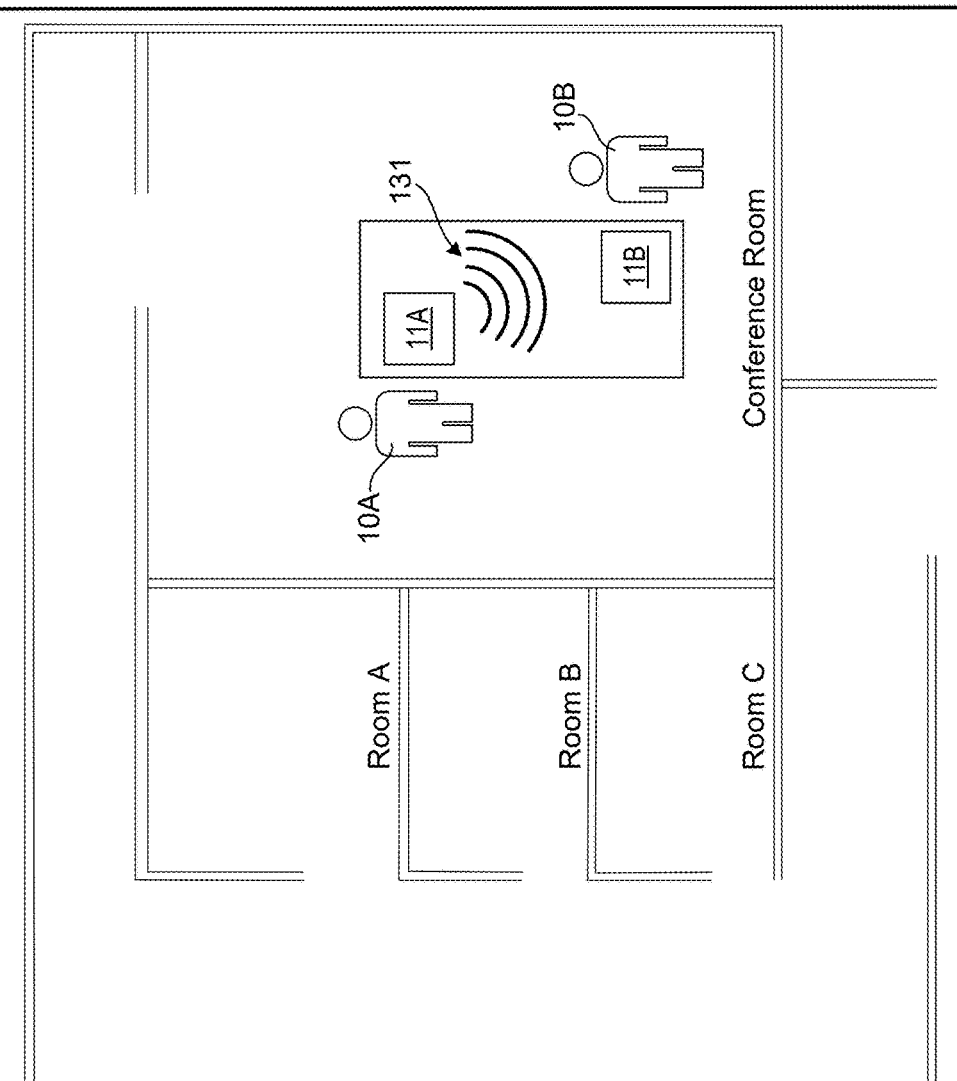

As shown in FIG. 2D, in response to the ping from the server, the first device 11A emits the first beacon signal 131. This first beacon 131 signal may last for a predetermined period of time, e.g., 5-10 seconds, and can be in any suitable frequency. In some embodiments, the first beacon 131 can be an ultrasound signal above 19.5 KHz, but other frequencies can be used. In addition, other close proximity signals can be used, e.g., Bluetooth, Wi-Fi Direct, etc. This first beacon 131 is also not encoded with any data, can be a simple waveform without modulation or encoding.

In this example, since the second device 11B is in the same room as the first device 11A, the second device 11B receives the first beacon 131 that is emitted from the first device 11A. The first beacon 131 emitted from the first device 11A is to be configured such that other devices that are not in the same room as the first device 11A, e.g., other devices out of an audible range like in Room A or Room B, should not receive the first beacon 131. For instance, if the second device 11B is in Room A, the second device 11B would not receive the first beacon from the first device in the Conference Room and the second device 11B would not invoke any computerized actions in response to the first beacon.

Figure 2E:
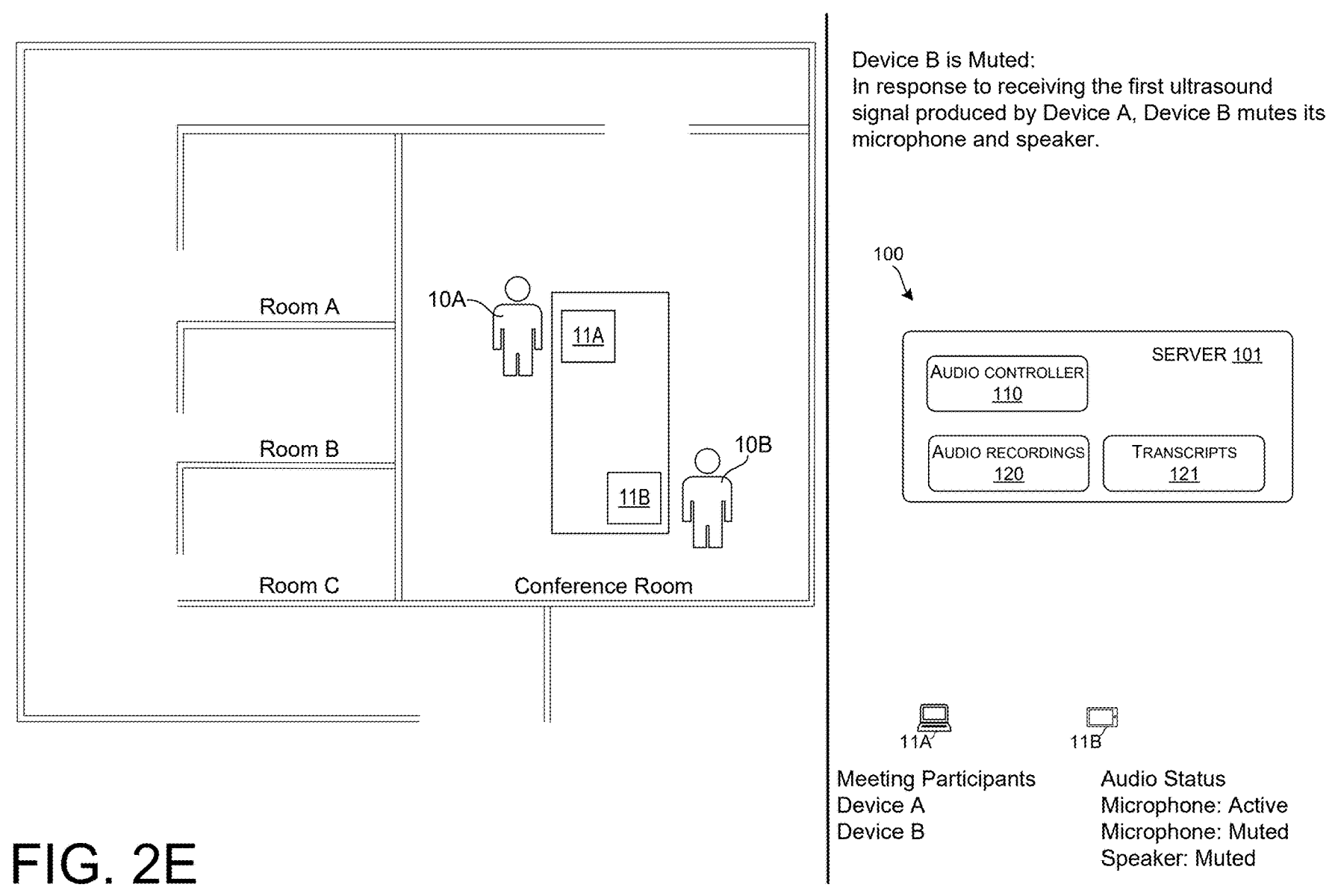

As shown in FIG. 2E and FIG. 2F, given that the second device 11B is the same room as the first device, the second device 11B receives the first beacon 131 and invokes two actions: the second device 11B mutes its microphone and speaker and then emits a second beacon signal. This allows the second device 11B to join the meeting without disrupting the meeting by generating feedback. As shown in FIG. 2F, the second beacon signal 132 emitted from the second device 11B is encoded with a meeting identifier and a user identifier. The meeting identifier can be an ID received from a meeting invitation, and the user identifier is associated with the user of the device, e.g., the second user 10B.

In some embodiments, the second device is to detect the first beacon signal, e.g., the howling detection beacon, from the first device and the second device mutes its microphone and speaker prior to sending any audio streams to the communication session. However, if the howling detection from the first device is delayed, the second device may start sending audio streams to the communication session, e.g., sending an audio stream to the server, before receiving the first beacon signal from the first device and before muting the microphone and speaker. In such embodiments, after sending the join request in FIG. 2B, the second device can go in a wait state for a predetermined period of time, and after the predetermined period of time the second device can unmute the microphone and speaker and send an audio stream from its microphone to the server for inclusion of that audio stream in the communication session.

As shown in FIG. 2G, given that the first device 11A is the same room as the second device 11B, the first device 11A receives the second beacon 132 and the first device 11A sends a confirmation 112 to the server 101. The confirmation 112 includes the session identifier and the user identifier that originated from the second device 11B and communicated to the first device 11A from the second device 11B via the second beacon signal 132. The server uses the session identifier and the user identifier that was received in the confirmation and verifies the session identifier and the user identifier against meeting records stored on the server.

As shown in FIG. 2H, once the server determines that the meeting that the second device is requesting to join is the same meeting that the first device is in, the server can send a control 113 to the second device to unmute the microphone and the speaker. This allows the second device to send an audio stream to the server for inclusion of that stream to the meeting. In addition, in response to determining that the meeting that the second device is requesting to join is the same meeting that the first device is in, the server determines that the two devices are co-located and the server operates in a co-location mode for the first device and the second device.

While in co-location mode, the server concurrently receives independent audio streams from the first device 11A and the second device 11B for inclusion in the communication session. This allows the server to record the meeting using audio streams from both devices, generate transcripts using audio streams from both devices, and communicate the audio streams from both devices to other remote devices that are participating in the meeting. In addition, while in co-location mode, the server restricts the audio stream generated by the first device 11A from being communicated to the second device 11B and restricts the second audio stream generated by the second device 11B from being communicated to the first device 11A. These restrictions reduce audio feedback generated by the first device and the second device. Although the speaker of the second device is unmuted, it will not emit the audio stream generated by the first device, however it will be enabled to receive and emit audio streams from other devices that are not co-located with the second device.

Figure 3B:
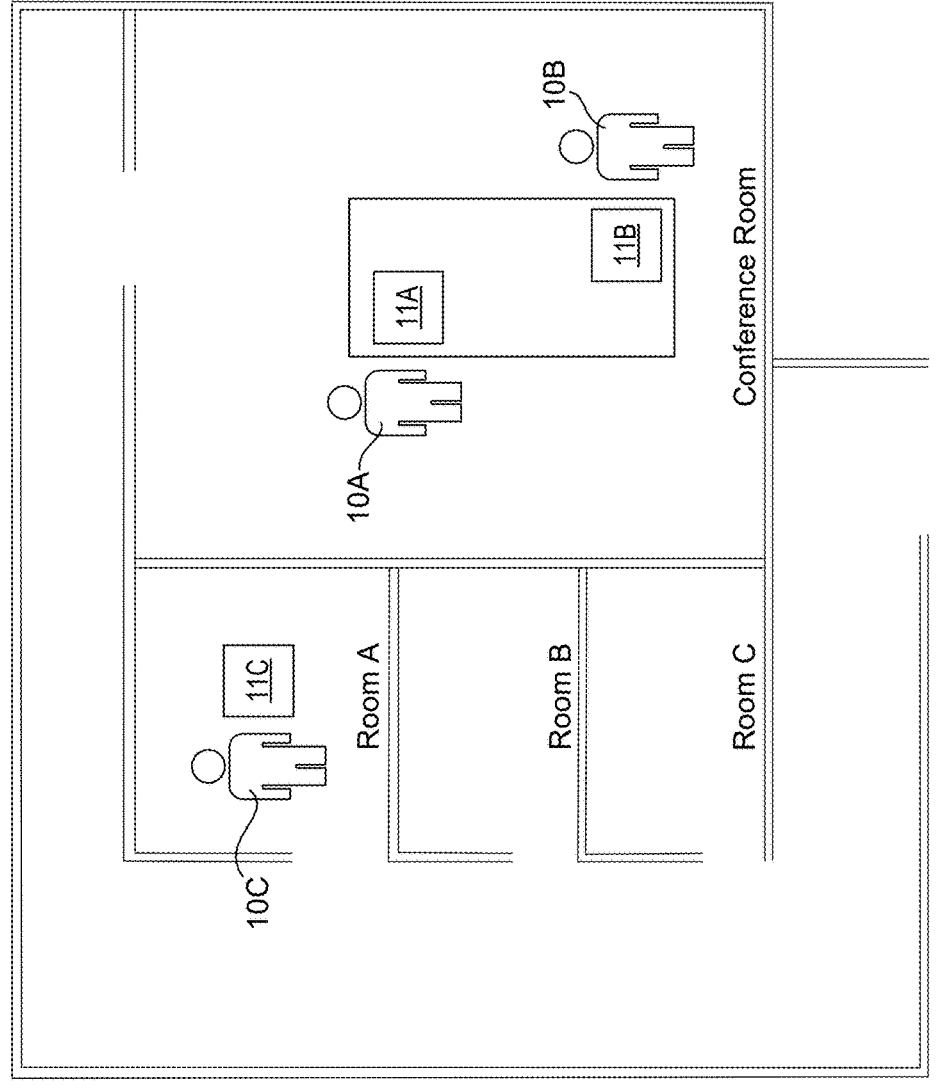
FIG. 3B shows a first phase of a process where a third device is requesting to join a meeting after two other devices have joined the meeting in co-location mode.

FIGS. 3A-3H is a continuation of the above-described example, where a third device 11C requests to join a meeting after the first device 11A and the second device 11B have joined the meeting in co-location mode. In this example, the third device joins with at least one of the microphone or the speaker in active mode, e.g., unmuted. FIG. 3A shows a state of a system after two devices have joined a meeting in co-location mode. This state is achieved by the process described above. In this state, e.g., in co-location mode for the first device and the second device, the server concurrently receives independent audio streams from the first device 11A and the second device 11B for inclusion in the communication session. This allows the server to record the meeting using audio streams from both devices, generate transcripts using audio streams from both devices, and communicate the audio streams from both devices to other remote devices that are participating in the meeting. In addition, while in co-location mode, the server restricts the audio stream generated by the first device 11A from being communicated to the second device 11B and restricts the second audio stream generated by the second device 11B from being communicated to the first device 11A.

FIG. 3B shows a first phase of a process where a third device is requesting to join a meeting after two other devices have joined the meeting in co-location mode. In this example, the third device sends a request to the server to join the meeting while at least one of the microphone or the speaker is activated, e.g., unmuted. The third device can send a request to the server by sending a session identifier and a user identifier for the third user 10C. As shown, the third device 11C and the third user 10C are in Room A, which in this example is out of an audible range from the devices in the Conference Room.

FIG. 3C shows a second phase of a process where a first device receives a ping 111 ("command") to emit a beacon signal in response to a third device requesting to join a meeting while two other devices are in co-location mode. The ping is sent from the server in response to receiving the request from the third device to join the meeting. In any embodiment disclosed herein, the server can also verify that the session identifier and user identifier received from the third device can be verified, and if the server determines that the session identifier and user identifier are valid, e.g., a meeting exists with those credentials, the server can send the ping to the first device or the second device.

FIG. 3D shows a third phase of a process where a first device emits a beacon signal 131 in response to the ping received from the server. This first beacon signal does not contain encoded data and the first beacon signal can include ultrasound signals or other signals that propagate within a room or within a predetermined range. The first device can emit the first beacon signal for a predetermine time, e.g., 5 seconds. The third device is configured to be in a listening mode for a predetermined time after it sends the request to join the meeting. However, since the first device and the third device are not in the same room, the third device does not receive the first beacon signal and therefore does not respond to the signal. The third device can be configured to be in listening mode for a predetermined time after it sends the join request, e.g., 5 seconds. After the predetermined time after the join request is sent, and if the third device does not receive the first beacon signal, the third device joins the meeting in regular operating mode, e.g., with the microphone and speaker unmuted. In some embodiments, the ping is also sent to the second device, or any other device that is in the meeting. If the ping is sent to the second device, the second device would respond by also emitting the beacon in the manner described above.

The second device can also be in listening mode because the third device, or any device of a newly joining participant, could join with the microphone and speaker muted, and immediately emit the encoded beacon. If the second device detects the first un-encoded beacon from the first device, there is no action because it is already in co-location mode.

If the second device detects the encoded beacon, the second device could also send that to the server to indicate co-location.

Then, as shown in FIG. 3E, in response to the first ultrasound signal from Device A: Device B takes no action from the ping since it is already in co-location mode. Also, in response to the first ultrasound signal from Device A, Device C does not receive the ultrasound signal since it is in another room and out of range for receiving an audible signal from Device A. As a result, Device C remains in standard mode with mic and speaker fully activated and in a mode where audio signals from the other devices are received at Device C and the other devices are receiving the audio stream from Device C.

In the embodiments described herein, the first beacon, e.g., the unencoded beacon, and the second beacon, the encoded beacon with the meeting identifier, can each use different frequencies so the two different types of beacons do not interfere with one another. For example, a first unencoded beacon can be at a first frequency, and a second encoded beacon including a meeting ID and a user ID could be at a second frequency.

Figure 4B:
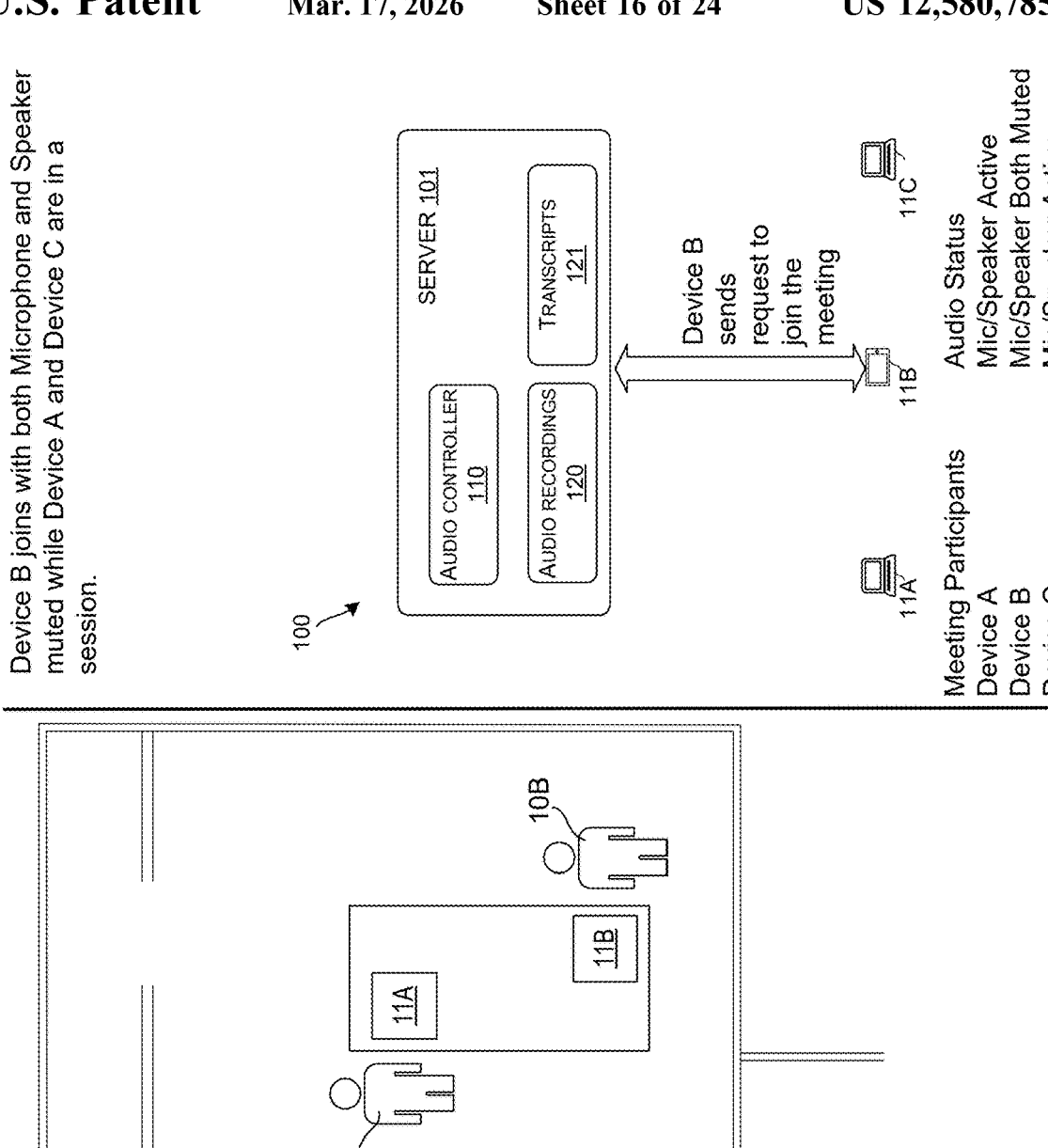
FIG. 4B shows a state of a system where a second device sends a request to a server to join the meeting with both the microphone and/or speaker in a muted state.

FIGS. 4A-4E show a process for identifying co-located devices when a device joins a meeting with a muted microphone and muted speaker. In this example, as shown in FIG. 4A, the process starts in a state where the first device 11A and the third device 11C are already in a meeting together sharing video streams and audio streams. In this example, the first user 10A of the first device 11A and the third user 10C of the third device 11C are in separate rooms and are not within an audible range of one another. The server has both devices running in regular audio mode. In regular audio mode, the server receives an audio stream from the first device 11A and shares that stream with the third device 11C, and the server also receives an audio stream from the third device 11C and shares that stream with the first device 11A.

As shown in FIG. 4B, the second device 11B sends a request to the server to join the meeting with both the microphone and speaker in a muted state. In this example, the second device 11B sends the request to the server while the first device 11A and the second device 11B are in the same room. The request to the server can include a meeting identifier and a user identifier to be used for a validation of the request. As shown in FIG. 4C, when the second device 11B sends the request to join the meeting with a muted microphone and muted speaker, the second device 11B is configured to emit a beacon signal 132. This beacon signal 132 emitted from the second device 11B is encoded with the meeting identifier and user identifier. This beacon signal can include a signal, such as one in an ultrasound signal in a frequency above 19.5 KHz. However, any other signal at any other suitable frequency can be used.

For the second device to send out beacon signal with session ID+user ID without receiving the first beacon signal from first device, the second device has both the microphone and speaker muted. In such embodiments, having only one of the speaker or microphone muted is not a sufficient condition for mitigating feedback. The reason for this is that people frequently join a conference with microphone muted for privacy reasons. But if a user joins with both mic and speaker muted, it is more likely they are co-located with someone.

Since the second device 11B is in the same room as the first device 11A, the first device 11A receives the beacon 132 that is emitted from the second device 11B. The beacon signal emitted from the second device 11B is configured such that other devices that are not in the same room as the second device 11B, e.g., other devices out of an audible range like the third device 11C, do not receive the beacon single 132. Since the third device 11C is not in the same room, this device does not receive the beacon signal and thus the third device 11C does not invoke any action as a result of the beacon signal.

As shown in FIG. 4D, given that the second device 11B is in the same room as the first device 11A, the first device 11A receives the beacon signal 132 and also receives the meeting identifier and user identifier that are encoded in the beacon signal 132. In response to receiving the beacon signal 132, the first device 11A sends a confirmation 114 to the server. The confirmation 114 includes the meeting identifier and the user identifier that originated from the second device 11B and communicated via the beacon signal 132. The server then verifies the meeting identifier and the user identifier with respect to meeting records stored on the server.

As shown in FIG. 4E, once the server determines the validity of the identifiers received in the confirmation 114 with the identifiers received in the request from the second device, the server sends a control 113 to the second device 11B to unmute the microphone and unmute the speaker. This allows the second device 11B to send an input audio stream "audio in" to the server for inclusion of that stream to the meeting, e.g., meeting records, transcripts, recordings, etc. In addition, in response to determining the validity of the identifiers received in the confirmation, the server determines that the first device 11A and the second device 11B are co-located and the server operates in a co-location mode for those two devices. While in co-location mode, the server concurrently receives independent audio streams from the first device 11A and the second device 11B for inclusion in the communication session, e.g., the meeting. This allows the server to record the meeting using audio streams from both devices, generate transcripts using audio streams from both devices, and communicate the audio streams from both devices to other remote devices that are participating in the meeting. In addition, while in co-location mode, the server restricts the audio stream generated by the first device 11A from being communicated to the second device 11B and restricts the second audio stream generated by the second device 11B from being communicated to the first device 11A. These restrictions reduce audio feedback generated by the first device and the second device.

For other devices that are not determined to be co-located with another device of the meeting, such as the third device 11C, the server communicates the input stream from that device to each of the co-located devices. The server also includes the input stream from the third device 11C in meeting content, such as the transcripts, recordings, etc. In addition, the server also communicates the input stream from the third device to each of the co-located devices, as shown.

Although the example shown in FIGS. 4A-4E illustrates an embodiment where the transmission of the beacon in the one-beacon protocol is sent from the second joiner, the beacon transmission can be sent from other computers that are already in the meeting. For example, in a scenario where User A and User C are in a meeting, and User B joins later with their microphone and speaker on mute, the second computer (associated with User B) can send a notification to the server indicating that the second computer has requested to join the meeting. In response to the notification, the system can cause other computers in the meeting, such as the first computer (associated with User A), to emit the beacon transmission encoded with the meeting identifier and user identifier for the new joiners to detect. That way, if more than one computer is joining at one time, e.g., User B, User D, User E, etc., those computers can receive the beacon that is transmitted by the first computer. In response to receiving the beacon from the first computer, those joining computers can send the confirmation to the server as shown in FIG. 4D, to which the server would invoke the co-location mode for all computers sending the confirmation and none of those computers would receive audio streams from one another.

Figure 5:
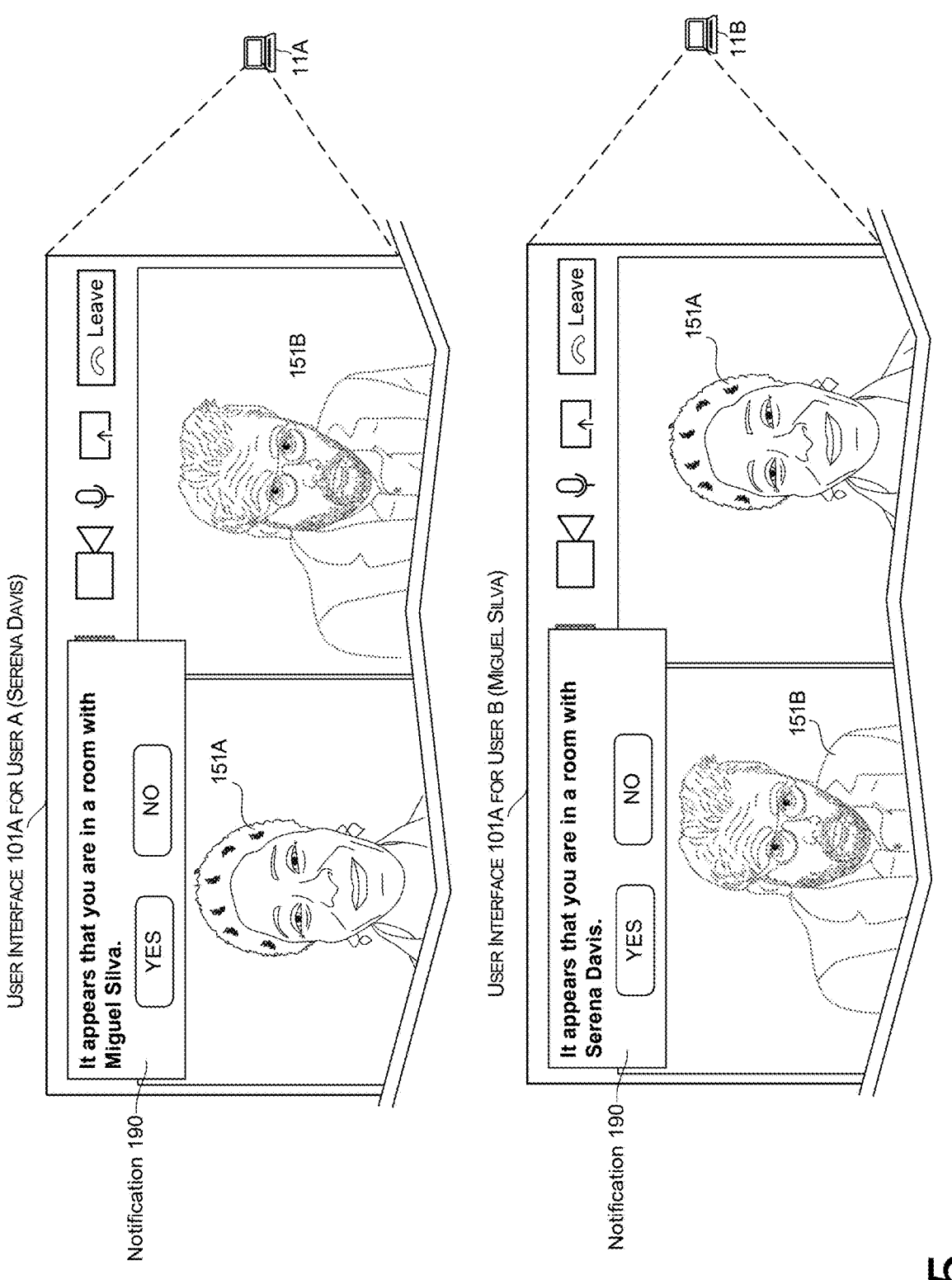
FIG. 5 shows a user interface used for receiving a user input for confirming entry into co-location mode.

FIG. 5 shows an example of a user interface that is displayed in response to determining that two or more devices are co-located. In this embodiment, the server causes each client to prompt the user to verify the co-location status of a device before entering the co-location mode. In this example, a notification 190 is displayed on the first device prompting the first user to confirm whether they are co-located with the second user and the second device. Another notification 190 is displayed on the second device prompting the second user to confirm whether they are co-located with the first user and the first device. If either user provides an input where they do not confirm the co-location status, the server enters a meeting in regular operating mode for each device and input audio streams received from each device are shared with one another. However, in some embodiments, if both devices confirm the co-location status the server enters co-location mode for both devices.

In some embodiments, the server can also enter co-location mode for two or more devices without receiving a confirmation from the client devices. In such embodiments, the server can post a notification once a co-location group is formed. This can be done in some scenarios since a false positive rate should be extremely low. This way, the technology is more transparent to the users.

Figure 6:
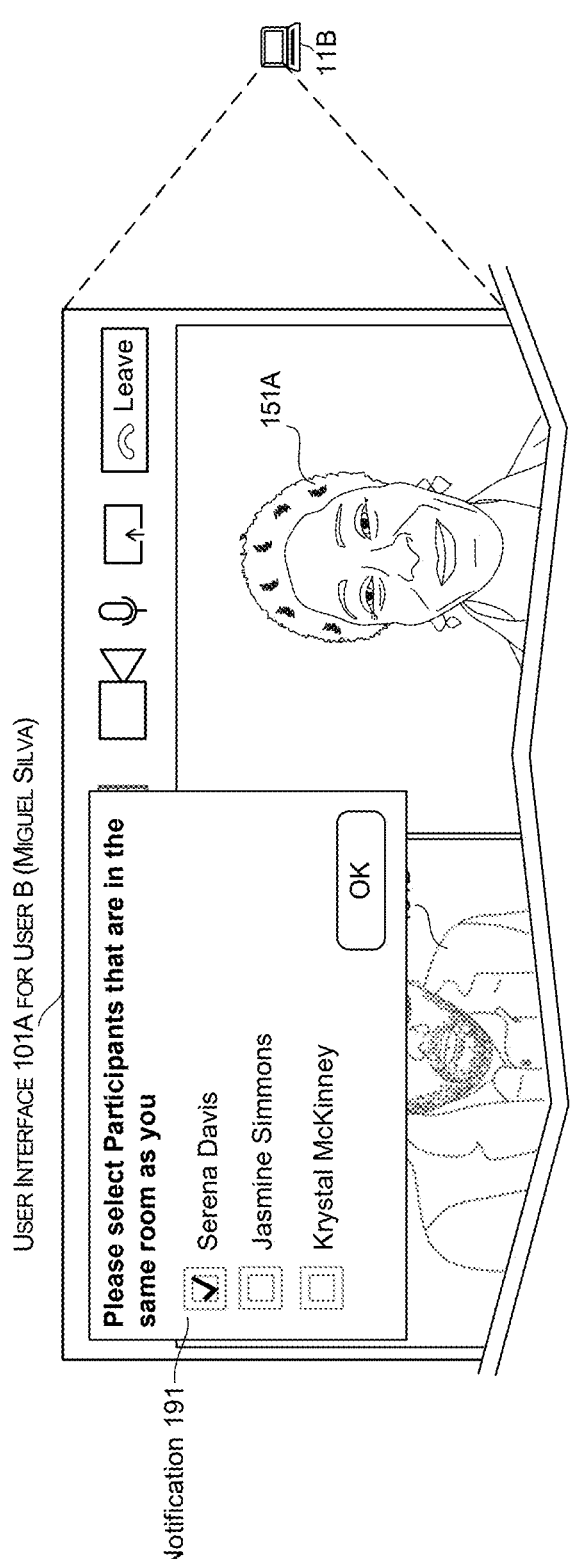
FIG. 6 shows a user interface used for receiving a user input for selecting users for entry into co-location mode.

FIG. 6 shows a manual mode where a system can provide a user interface with a notification 191 that lists each person in a meeting. The user can select any combination of people from the list. The system can cause each device of each selected person to invoke the co-location mode. This list may be prioritized and/or filtered based on the protocols disclosed herein. For instance, the list may include all users of a meeting but list the users of devices that are determined to be co-located using one or more beacon signals higher on the list or display those names in a more prominent location or more prominent format vs people with devices that were not determined to be co-located using one or more beacon signals.

Figure 7:
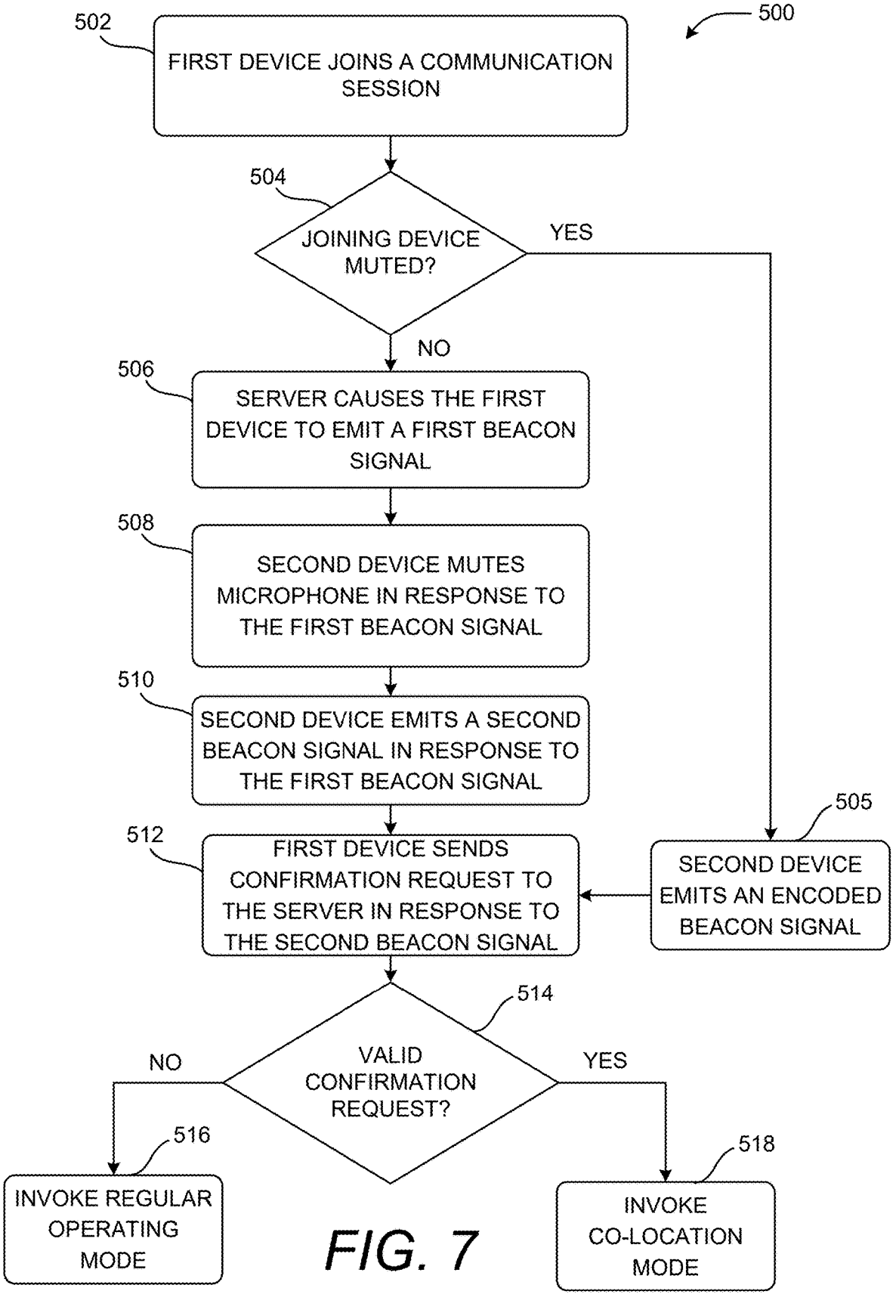
FIG. 7 is a flow diagram showing aspects of a routine for the disclosed techniques.

Turning now to FIG. 7, aspects of a routine 500 for reducing feedback during a meeting join process are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by an application, component and/or circuit, such as a device module that can be included in any one of the memory components disclosed herein, including but not limited to RAM. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor or circuit of another remote computer (which can be a server) or a local processor or circuit of a local computer (which can be a client device receiving a message or a client device sending the message). In addition, one or more of the operations of the routine may alternatively or additionally be implemented, at least in part, by a chipset working alone or in conjunction with other software modules. Any service, circuit or application suitable for providing input data indicating the state of any device may be used in the operations described herein.

The routine starts at operation 502 where the first device 11A associated with the first user 10A establishes a connection with the server to join a communication session, e.g., an online meeting. This is to show that the first device 11A is a device that is connected to the meeting before the second device 11B sends a request to join the meeting.

At operation 504, the system determines an operating state of a microphone and/or speaker of the second device when the second device 11B sends a request to join the meeting. In this example, the second device 11B sends the request to the server with the microphone and/or speaker in an unmuted state. Also, as shown the first device 11A and the second device 11B are in the same room. At the server, this includes receiving a request from the second device 11B to join the communication session associated with a session identifier, e.g., a meeting identifier (ID).

At operation 504, the server determines if an operating state of a microphone or speaker of the second device meets one or more criteria with respect to a preset condition. For example, if the second device receives an input to join a meeting and the microphone and the speaker of the second device are muted, a first preset condition is met and the routine proceeds directly to operation 505 where the second device emits an encoded beacon signal with the meeting ID and a user ID to be received by all devices that are in physical proximity to the second device. Then the routine proceeds from operation 505 to operation 512 where the first client receives the encoded beacon signal and generates a confirmation request for the server. However, at operation 504, if the second device receives an input to join a meeting while the microphone and/or the speaker of the second device are not muted, a second preset condition is met and the routine proceeds to operation 506.

At operation 506, the server causes the first device to emit a first beacon signal 131. The server sends a ping (a "command") to the first device 11A instructing the first device 11A to generate a beacon signal. As shown in FIG. 2D, in response to the ping from the server, the first device 11A emits the first beacon signal 131. This first beacon 131 signal may last for a predetermined period of time, e.g., 5-10 seconds, and can be in any suitable frequency. In some embodiments, the first beacon 131 can be an ultrasound signal above 19.5 KHz, but other frequencies can be used. In addition, other close proximity signals can be used, e.g., Bluetooth, Wi-Fi Direct, etc. This first beacon 131 is also not encoded with any data, can be a simple waveform without modulation or encoding.

At operation 508, the second device 11B mutes its microphone and speaker in response to the first beacon signal 131. This allows the second device 11B to join the meeting without disrupting the meeting by generating feedback. For example, as shown in FIG. 2E, since the second device 11B is in the same room as the first device 11A, the second device 11B receives the first beacon 131 that is emitted from the first device 11A. The first beacon 131 emitted from the first device 11A is to be configured such that other devices that are not in the same room as the first device 11A, e.g., other devices out of an audible range like in Room A or Room B, should not receive the first beacon 131. For instance, if the second device 11B is in Room A, the second device 11B would not receive the first beacon from the first device in the Conference Room and the second device 11B would not invoke any computerized actions in response to the first beacon.

At operation 510, in response to receiving the first beacon signal at the second device, the second device 11B emits a second beacon signal in addition to muting its microphone. As shown in FIG. 2F, the second beacon signal 132 emitted from the second device 11B is encoded with a meeting identifier and a user identifier. The meeting identifier can be an ID received from a meeting invitation, and the user identifier is associated with the user of the device, e.g., the second user 10B.

At operation 512, given that the first device 11A is the same room as the second device 11B, the first device 11A receives the second beacon 132 and the first device 11A sends a confirmation 112 to the server 101. The confirmation 112 includes the session identifier and the user identifier that originated from the second device 11B and communicated to the first device 11A from the second device 11B via the second beacon signal 132.

At decision block 514, the server then verifies the session identifier and the user identifier received in the confirmation 112 request. If at operation 514, these credentials are not valid, the routine proceeds to operation 516, where the server invokes a regular operating mode. In regular operating mode, each input audio stream received from each client device are shared with each of the other client devices. For instance, for a ten-person meeting, audio streams from each of the individual devices are distributed to the other nine devices. However, if at decision block 514, the credentials are determined to be valid, routine proceeds to operation 518 where the server invokes a co-location mode. In co-location mode each co-located device has an active microphone and the audio stream of each device is integrated into the meeting content and other remote users, but each co-located device does not share audio streams between each other.

In any operation where the server verifies the session identifier and the user identifier, the verification process can use meeting records stored on the server. Each time a join request or confirmation is received from a client, the server can check any received identifier, e.g., the user identifier and/or the meeting identifier, to determine if the request or the confirmation has a valid identifier. Each received identifier can be compared to a calendar database. For instance, an Outlook calendar database can include a list of meetings and attendees for each meeting. If a client sends a request to join a meeting and sends a user identifier and a meeting identifier, those identifiers can be analyzed to determine if the meeting exists in the calendar database and also analyzed to determine if the requesting person is a valid invitee. If the requesting person is not an invitee or if the meeting identifier does not exist or is no longer valid, the routine can terminate and the join request can be denied and the routine can terminate at any stage.

In some embodiments, when a requesting person attempts to join a meeting with both the microphone and speaker muted, the routine can start at operation 505, where the requesting computer sends a beacon with encoded data identifying the meeting. This can be used to directly instruct a computer already in the meeting to send a request to the server and the server can send a command back to the requesting computer to either deny entry, accept entry in regular mode or accept entry in co-location mode.

FIGS. 4A-4E show operations performed by the server for an embodiment where the client sends a meeting join request with the microphone and the speakers muted. For such an embodiment, the client may first determine if a software mute, e.g., a soft mute, is applied to a microphone and/or the speaker. If the microphone and/or the speakers are active, the system may apply the routine as described above with respect to the flow diagram. However, if the client sending a join request determines that the microphone and/or the speakers are muted, the system causes operations that are as follows in a method, executed on a system 100, reducing audio feedback during a process where a first client device 11A in a communication session is joined by a second client device 11B. The method can include receiving a request from the second device 11B to join the communication session associated with a session identifier, wherein the request from the second device is received while the first device 11A is already in the communication session, the second device 11B in an operating mode where a microphone and a speaker of the second device 11B is muted, the second device 11B transmitting a beacon signal 132 having encoded therein a session identifier and a user identifier that originated from the second device 11B. This is shown in FIGS. 4B and 4C, where the second computer joins with microphone and speaker muted "join without audio" feature and sends a beacon with encoded meeting data. This can include the detection of microphone and speaker as being muted. In other embodiments, if either the microphone or the speaker are muted, the system invokes these operations shown in FIGS. 4A-4E.

Although the example shown in FIGS. 4A-4E illustrates an embodiment where the transmission of the beacon in the one-beacon protocol is sent from the second joiner, the beacon transmission can be sent from other computers that are already in the meeting. For example, in a scenario where User A and User C are in a meeting, and User B joins later with their microphone and speaker on mute, the second computer (associated with User B) can send a notification to the server indicating that the second computer has requested to join the meeting. In response to the notification, the server can cause other computers in the meeting, such as the first computer (associated with User A) or all existing devices in the meeting, to emit the beacon transmission encoded with the meeting identifier and user identifier for the new joiners to detect. That way, if more than one computer is joining at one time, e.g., User B, User D, User E, etc., those computers can receive the beacon that is transmitted by the first computer. In response to receiving the beacon from the first computer, those joining computers can send the confirmation to the server as shown in FIG. 4D, to which the server would invoke the co-location mode for all computers sending the confirmation and none of those computers would receive audio streams from one another. Such embodiments can save processing cycles since in-meeting devices won't need to keep running detection logic throughout the whole meeting.

The method also includes receiving a confirmation 114 from the first device 11A indicating that the first device 11A received at least one of the session identifier or the user identifier that originated from the second device 11B and communicated to the first device 11A from the second device 11B via the beacon signal 132. This is shown in FIG. 4D where the server receives the confirmation from the first client in response to the ultrasound signal generated by the second client. Then, in response to receiving the confirmation 114 from the first device 11A: communicating control data 113 to the second device 11B causing the second device 11B to unmute the microphone of the second device 11B, and transition to a co-location mode for the first device 11A and the second device 11B, while in co-location mode: concurrently receiving independent audio streams from the first device 11A and the second device 11B for inclusion in the communication session, and restricting a first audio stream generated by the first device 11A to be communicated to the second device 11B and restricting a second audio stream generated by the second device 11B to be communicated to the first device 11A, the restrictions reducing audio feedback generated by the first device and the second device. This is shown in FIG. 4E, where the server sends a command to turn on, e.g., unmute, the microphone of the second client and run both clients under co-location mode.

The routine also includes operations that are performed by specific client devices. For instance, operations for the first device are described below when the second device joins without a muted microphone. This method, executed on a first device 11A, for reducing audio feedback during communication sessions, the method comprising: sending a request from the first device 11A to a server 101 to join a communication session associated with a session identifier, wherein the request causes the first device 11A to join the communication session. This is shown in FIG. 2A where the first client joins the meeting based on a Meeting ID. The method further comprises, as shown in FIGS. 2B-2D, where the first client sends the first ultrasonic signal with no data to mute the second client and cause the second client to send a second ultrasonic signal with data, this includes receiving a command 111, at the first device 11A, the command sent from the server 101 in response to a request received at the server from a second device 11B to join the communication session associated with the session identifier, wherein the first device 11A is permitted to join the communication session prior to the request received by the second device 11B, the command causing the first device 11A to generate a first beacon signal 131, the first beacon signal 131 causing the second device 11B to, as shown in FIG. 2E, the second client muting its microphone based on an input from the server, mute a microphone of the second device 11B to restrict an audio input from the microphone of the second device 11B to the communication session, and, as shown in FIG. 2F, the second computer sending the second ultrasound signal with a meeting ID and a User ID User of the second client, transmit a second beacon signal 132 having encoded therein a session identifier and a user identifier that origi- nated from the second device 11B. The method further including, as shown in FIGS. 2G and 2H, sending the confirmation from the first client in response to receiving the second ultrasound signal by receiving the second beacon signal 132 from the second device; and sending a confir- mation 112 from the first device 11A to the server indicating that the first device 11A received at least one of the session identifier or the user identifier that originated from the second device 11B and communicated to the first device 11A from the second device 11B via the second beacon signal 132, the confirmation 112 causing the server to send control data 113 to the second device 11B causing the second device 11B to unmute the microphone of the second device 11B and cause audio signals generated by the microphone of the second device 11B to be included in the communication session, the confirmation further causing the server to tran- sition to a co-location mode for the first device 11A and the second device 11B, while in co-location mode: concurrently receiving independent audio streams the first device 11A and the second device 11B for inclusion in the communication session, the confirmation further causing the server to restrict a first audio stream generated by the first device 11A to be communicated to the second device 11B and restrict a second audio stream generated by the second device 11B to be communicated to the first device 11A to reduce audio feedback generated by the first device and the second device.

FIGS. 2A-2H also show operations for the second client device sending a request to join without muting the mic and speaker. A method executed on a client device 11B for reducing audio feedback during a communication session a remote computing device 11A that is already in the com- munication session with a server, the method comprising, as shown in FIG. 2A-2B: the first client 11A joins the meeting based on a Meeting ID, then the second device 11B sends the request to join the meeting, sending a request from the client device 11B to join the communication session using a session identifier, wherein the request is sent after the remote computing device 11A has joined the communication ses- sion. As shown in FIGS. 2C-2D: cause the first client to send the first ultrasonic signal no data to mute the second client and cause the second client to send a second ultrasonic signal with data, the method further comprising receiving a first beacon signal 131 at a receiver or sensor at the client device 11B, the first beacon signal 131 sent from the remote computing device 11A in response to the server sending a command 111 to the remote computing device 11A, wherein the server sends the command 111 in response to request from the client device 11B to join the communication session using the session identifier, the first beacon signal 131 causing the client device 11B to, as shown in FIG. 2E, the second client muting its microphone and speakers based on an input, mute a microphone of the client device 11B to restrict an audio input from the microphone of the client device 11B to the communication session, and, as shown in FIGS. 2F, 2G and 2H, the second computer sending the second ultrasound with a meeting ID and a User ID User of the second client, transmit a second beacon signal 132 having encoded therein a session identifier and a user identifier that originated from the client device 11B, the second beacon signal 132 causing the remote computing device 11A to send a confirmation 112 to the server indi- cating that the first device 11A received at least one of the session identifier or the user identifier that originated from the client device 11B and communicated to the first device 11A from the client device 11B via the second beacon signal 132, the server responding to the confirmation 112 from the remote computing device 11A by: transitioning to a co- location mode for the remote computing device 11A and the client device 11B, and while in co-location mode: concur- rently receiving independent audio streams the remote com- puting device 11A and the client device 11B for inclusion in the communication session, and restricting a first audio stream generated by the remote computing device 11A to be communicated to the client device 11B and restricting a second audio stream generated by the client device 11B to be communicated to the remote computing device 11A to reducing audio feedback generated by the first device and the client device, and communicating control data 113 to the client device 11B causing the client device 11B to unmute the microphone of the client device 11B and cause audio signals generated by the microphone of the client device 11B to be included in the communication session; and using the control data 113, at the client device 11B, to unmute the microphone of the client device 11B and cause audio signals generated by the microphone of the client device 11B to be included in the communication session.

Figure 8:
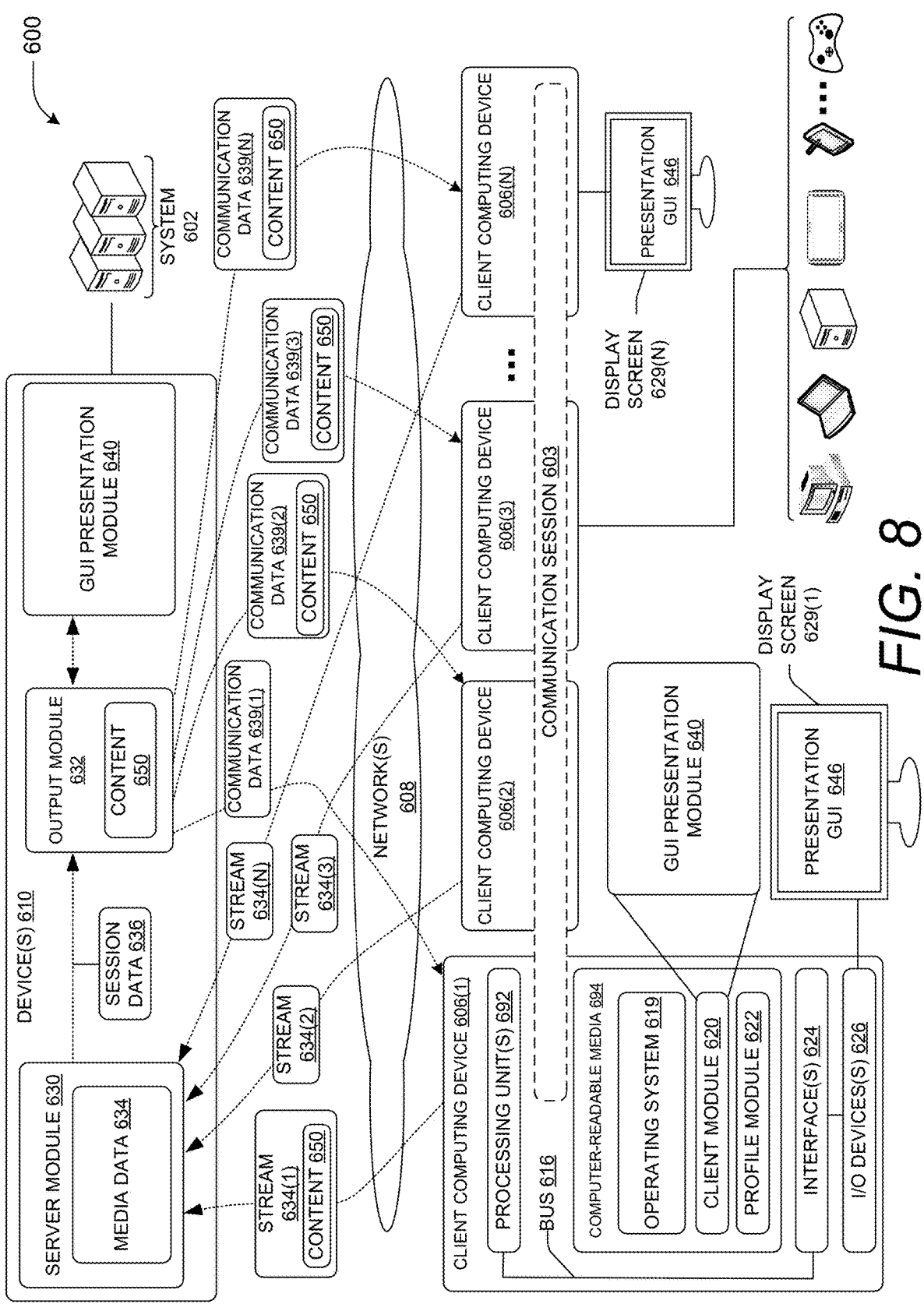
FIG. 8 is a diagram illustrating a distributed computing environment capable of implementing aspects of the techniques and technologies presented herein.

Turning now to FIG. 8, a diagram illustrating an example environment 600 in which a system 602 can implement the disclosed techniques is shown. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be imple- mented in hardware, software, or a combination thereof. In the context of software, the operations represent computer- executable instructions stored on one or more computer- readable media that, when executed by one or more proces- sors, enable the one or more processors to perform the recited operations.

Generally, computer-executable instructions include rou- tines, programs, objects, modules, components, data struc- tures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 603. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds can be communicated with the messages.

The system 602 of FIG. 8 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses. Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). This can include ultrasound sensors that can generate and receive sounds that are above 20 KHz and also receive data through this sensor. FIG. 8 illustrates that client computing device 606(1) is in some way connected to a display device (e.g., a display screen 629(N)), which can display a UI according to the techniques described herein.

In the example environment 600 of FIG. 8, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 8) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 9:
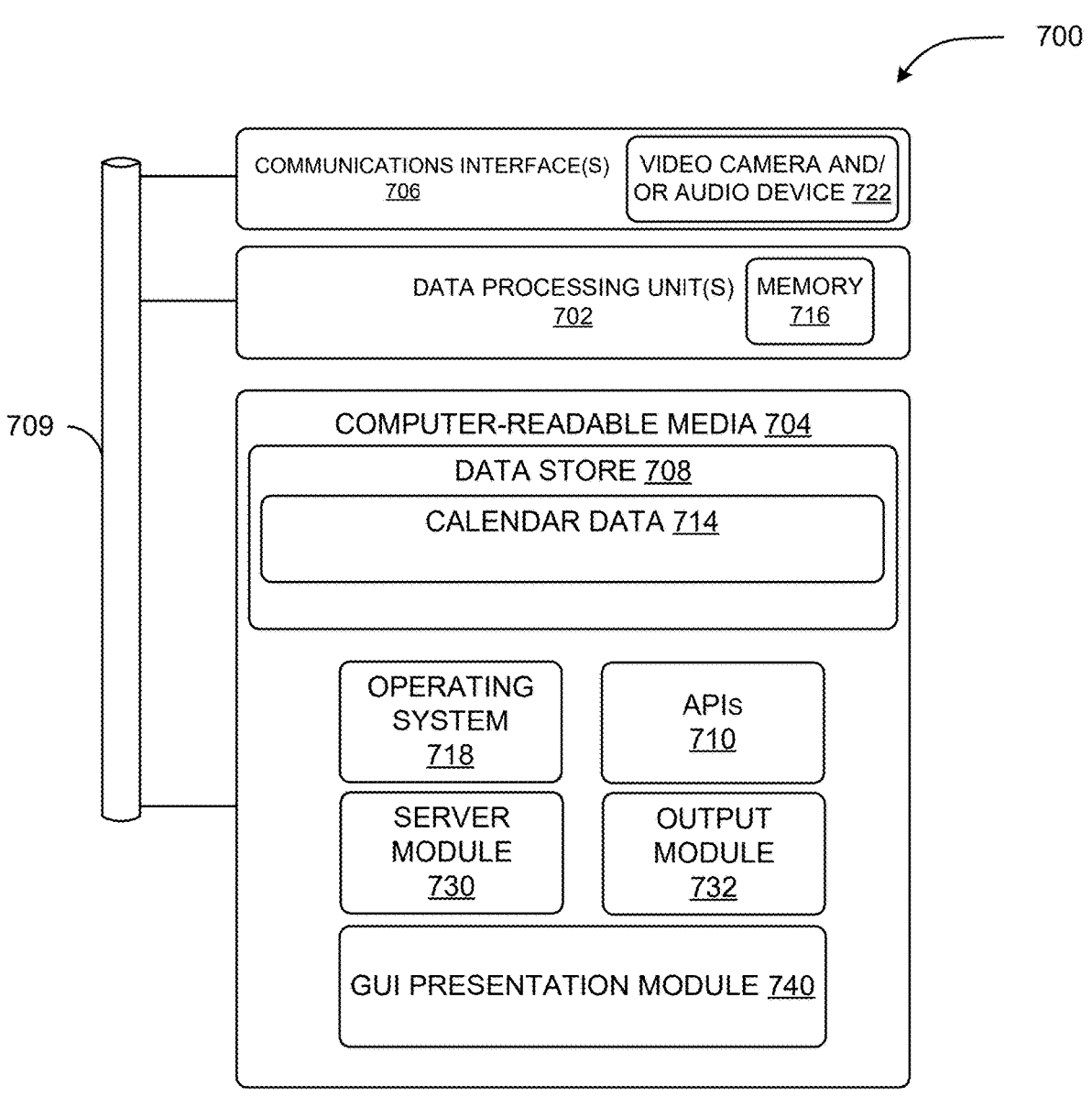
FIG. 9 is a computer architecture diagram illustrating a computing device architecture for a computing device capable of implementing aspects of the techniques and technologies presented herein.

FIG. 9 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("AS-SPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth. In some embodiments, each computing device can include an individual sensor to detect and receive the beacon signals, such as the audio device 722 of FIG. 9. This can be separate than a microphone that is used to detect user speech. Each device can also include an emitter that is separate from the speaker for emitting the voice communication of each stream.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 9), profile data (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include calendar data 714, such as an Outlook calendar database that stores meeting data for multiple users.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described.

Rather, the specific features and acts are disclosed as example forms of implementing the claimed subject matter.

We claim:

1. A method, executed on a system, for reducing audio feedback during a process where a first device in a communication session is joined by a second device, the method comprising:

receiving a request from the second device to join the communication session associated with a session identifier, wherein the request from the second device is received while the first device is already in the communication session;

determining that an operating state of a microphone or speaker of the second device meets one or more criteria with respect to a preset condition;

in response to determining that the operating state of the microphone or speaker of the second device meets the one or more criteria with respect to a preset condition, communicating a command to the first device causing the first device to generate a first beacon signal, the first beacon signal causing the second device to:

mute a microphone and a speaker of the second device to restrict an audio input from the microphone of the second device to the communication session, and transmit a second beacon signal having encoded therein a session identifier and a user identifier that originated from the second device;

receiving a confirmation from the first device indicating that the first device received at least one of the session identifier or the user identifier that originated from the second device and communicated to the first device from the second device via the second beacon signal; and in response to receiving the confirmation from the first device:

causing communication of control data to the second device causing the second device to unmute the microphone of the second device and cause audio signals generated by the microphone of the second device to be included in the communication session, and invoking a co-location mode for the first device and the second device, while in co-location mode:

concurrently receiving independent audio streams from the first device and the second device for inclusion in the communication session, restricting a first audio stream generated by the first device from being communicated to the second device and restricting a second audio stream generated by the second device from being communicated to the first device, the restrictions reducing audio feedback generated by the first device and the second device.

2. The method of claim 1, further comprising: verifying at least one of the session identifier or the user identifier received in the confirmation from the first device, wherein the co-location mode is restricted from being invoked if the at least one of the session identifier or the user identifier is determined to be invalid.

3. The method of claim 1, further comprising: verifying at least one of the session identifier or the user identifier received in the confirmation from the first device, wherein the second device is restricted from joining the communication session if the at least one of the session identifier or the user identifier is determined to be invalid.

4. The method of claim 1, wherein the confirmation received from the first device is sent to the system in response to a determination that at least one of the session identifier or the user identifier received via the second beacon signal at the first device is determined to be invalid at the first client.

5. The method of claim 1, further comprising:

causing a display of a user interface at the first device indicating that the second device is identified as being co-located with the first device; and causing a display of a user interface at the second device indicating that the first device is identified as being co-located with the second device, wherein the co-location mode is invoked in response to receiving at least one confirmation from the first device and the second device that the first device and the second device are co-located.

6. The method of claim 1, wherein a third device is participating in the communication session, wherein a status of the third device indicates that the third device is not co-located with the first device and the second device, wherein co-location mode of the first device and the second device includes concurrently receiving independent audio streams from the first device, the second device, and the third device for inclusion in content of the communication session, the content including at least one of audio recordings, audio transcripts, or meeting summaries, wherein a third audio stream generated by the third device is communicated to the first device and the second device while restricting the first audio stream generated by the first device from being communicated to the second device and restricting the second audio stream generated by the second device from being communicated to the first device, the restrictions for reducing audio feedback generated by the first device and the second device.

7. The method of claim 1, wherein causing the second device to mute the microphone and the speaker of the second device occurs prior to communicating the audio stream generated by the second device to any device participating in the communication session.

8. A system for reducing audio feedback during a process where a first device in a communication session is joined by a second device, comprising:

one or more processing units; and a computer-readable storage medium having encoded thereon computer-executable instructions to cause the one or more processing units to:

receive a request from the second device to join the communication session associated with a session identifier, wherein the request from the second device is received while the first device is already in the communication session;

in response to the receiving a request from a second device to join the communication session, communicate a command to the first device causing the first device to generate a first beacon signal, the first beacon signal causing the second device to:

mute a microphone and a speaker of the second device to restrict an audio input from the microphone of the second device to the communication session, and transmit a second beacon signal having encoded therein a session identifier and a user identifier that originated from the second device;

receive a confirmation from the first device indicating that the first device received at least one of the session identifier or the user identifier that originated from the second device and communicated to the first device from the second device via the second beacon signal; and in response to receiving the confirmation from the first device:

communicate control data to the second device causing the second device to unmute the microphone of the second device and cause audio signals generated by the microphone of the second device to be included in the communication session, and invoke a co-location mode for the first device and the second device, while in co-location mode:

concurrently receiving independent audio streams from the first device and the second device for inclusion in the communication session, restricting a first audio stream generated by the first device from being communicated to the second device and restricting a second audio stream generated by the second device from being communicated to the first device, the restrictions reducing audio feedback generated by the first device and the second device.

9. The system of claim 8, wherein the instructions further cause the one or more processing units to verify at least one of the session identifier or the user identifier received in the confirmation from the first device, wherein the co-location mode is restricted from being invoked if the at least one of the session identifier or the user identifier is determined to be invalid.

10. The system of claim 8, wherein the instructions further cause the one or more processing units to verify at least one of the session identifier or the user identifier received in the confirmation from the first device, wherein the second device is restricted from joining the communication session if the at least one of the session identifier or the user identifier is determined to be invalid.

11. The system of claim 8, wherein the confirmation received from the first device is sent to the system in response to a determination that at least one of the session identifier or the user identifier received via the second beacon signal at the first device is determined to be invalid at the first client.

12. The system of claim 8, wherein the instructions further cause the one or more processing units to:

cause a display of a user interface at the first device indicating that the second device is identified as being co-located with the first device; and cause a display of a user interface at the second device indicating that the first device is identified as being co-located with the second device, wherein the co-location mode is invoked in response to receiving at least one confirmation from the first device and the second device that the first device and the second device are co-located, wherein the co-location mode is restricted if either the first device and the second device do not confirm that the first device and the second device are co-located.

13. The system of claim 8, wherein a third device is participating in the communication session, wherein a status of the third device indicates that the third device is not co-located with the first device and the second device, wherein co-location mode of the first device and the second device includes concurrently receiving independent audio streams from the first device, the second device, and the third device for inclusion in content of the communication session, the content including at least one of audio recordings, audio transcripts, or meeting summaries, wherein a third audio stream generated by the third device is communicated to the first device and the second device while restricting the first audio stream generated by the first device from being communicated to the second device and restricting the second audio stream generated by the second device from being communicated to the first device, the restrictions for reducing audio feedback generated by the first device and the second device.

14. The system of claim 8, wherein causing the second device to mute the microphone and speaker of the second device occurs prior to communicating the audio stream generated by the second device to one or more devices participating in the communication session, if the first beacon signal is not received at the second device after a predetermined period of time, the second device unmutes the microphone and speaker and resumes communicating the audio stream generated by the second device to the one or more devices participating in the communication session.

15. A computer-readable storage medium having encoded thereon computer-executable instructions for reducing audio feedback during a process where a first device in a communication session is joined by a second device, the executable instructions causing one or more processing units of a system to:

receive a request from the second device to join the communication session associated with a session identifier, wherein the request from the second device is received while the first device is already in the communication session;

in response to the receiving a request from a second device to join the communication session, communicate a command to the first device causing the first device to generate a first beacon signal, the first beacon signal causing the second device to:

mute a microphone and speaker of the second device to restrict an audio input from the microphone of the second device to the communication session, and transmit a second beacon signal having encoded therein a session identifier and a user identifier that originated from the second device;

receive a confirmation from the first device indicating that the first device received at least one of the session identifier or the user identifier that originated from the second device and communicated to the first device from the second device via the second beacon signal; and in response to receiving the confirmation from the first device:

communicate control data to the second device causing the second device to unmute the microphone of the second device and cause audio signals generated by the microphone of the second device to be included in the communication session, and invoke a co-location mode for the first device and the second device, while in co-location mode:

concurrently receiving independent audio streams from the first device and the second device for inclusion in the communication session, restricting a first audio stream generated by the first device from being communicated to the second device and restricting a second audio stream generated by the second device from being communicated to the first device, the restrictions reducing audio feedback generated by the first device and the second device.

16. The computer-readable storage medium of claim 15, wherein the instructions further cause the one or more processing units to verify at least one of the session identifier or the user identifier received in the confirmation from the first device, wherein the co-location mode is restricted from being invoked if the at least one of the session identifier or the user identifier is determined to be invalid.

17. The computer-readable storage medium of claim 15, wherein the instructions further cause the one or more processing units to verify at least one of the session identifier or the user identifier received in the confirmation from the first device, wherein the second device is restricted from joining the communication session if the at least one of the session identifier or the user identifier is determined to be invalid.

18. The computer-readable storage medium of claim 15, wherein the confirmation received from the first device is sent to the system in response to a determination that at least one of the session identifier or the user identifier received via the second beacon signal at the first device is determined to be invalid at the first client.

19. The computer-readable storage medium of claim 15, wherein the instructions further cause the one or more processing units to:

cause a display of a user interface at the first device indicating that the second device is identified as being co-located with the first device; and cause a display of a user interface at the second device indicating that the first device is identified as being co-located with the second device, wherein the co-location mode is invoked in response to receiving at least one confirmation from the first device and the second device that the first device and the second device are co-located, wherein the co-location mode is restricted if either the first device and the second device do not confirm that the first device and the second device are co-located.

20. The computer-readable storage medium of claim 15, wherein a third device is participating in the communication session, wherein a status of the third device indicates that the third device is not co-located with the first device and the second device, wherein co-location mode of the first device and the second device includes concurrently receiving independent audio streams from the first device, the second device, and the third device for inclusion in content of the communication session, the content including at least one of audio recordings, audio transcripts, or meeting summaries, wherein a third audio stream generated by the third device is communicated to the first device and the second device while restricting the first audio stream generated by the first device from being communicated to the second device and restricting the second audio stream generated by the second device from being communicated to the first device, the restrictions for reducing audio feedback generated by the first device and the second device.

* * * * *